(12) United States Patent
Kasuga et al.

(10) Patent No.: US 7,791,524 B2
(45) Date of Patent: Sep. 7, 2010

(54) SOLID-STATE IMAGING DEVICE, SEMICONDUCTOR INTEGRATED CIRCUIT, AND SIGNAL PROCESSING METHOD

(75) Inventors: Shigetaka Kasuga, Osaka (JP); Yoshihisa Kato, Shiga (JP); Takahiko Murata, Osaka (JP); Takayoshi Yamada, Toyama (JP)

(73) Assignee: Panasonic Corporation, Osaka (JP)

( * ) Notice: Subject to any disclaimer, the term of this patent is extended or adjusted under 35 U.S.C. 154(b) by 3 days.

(21) Appl. No.: 12/388,105

(22) Filed: Feb. 18, 2009

(65) Prior Publication Data

US 2009/0212985 A1 Aug. 27, 2009

(30) Foreign Application Priority Data

Feb. 22, 2008 (JP) ............................. 2008-041657

(51) Int. Cl.
*H03M 1/12* (2006.01)
(52) U.S. Cl. ..................... 341/156; 341/155; 348/294; 348/241
(58) Field of Classification Search ................. 341/155, 341/156; 348/294, 241
See application file for complete search history.

(56) References Cited

U.S. PATENT DOCUMENTS

| | | | |
|---|---|---|---|
| 4,144,525 A | 3/1979 | O'Neill | |
| 4,804,939 A | 2/1989 | Cake et al. | |
| 5,306,157 A * | 4/1994 | Francisco | 439/52 |
| 5,392,045 A * | 2/1995 | Yee | 341/156 |
| 5,880,691 A * | 3/1999 | Fossum et al. | 341/162 |
| 6,252,536 B1 * | 6/2001 | Johnson et al. | 341/155 |
| 6,696,997 B2 * | 2/2004 | Kaplinsky | 341/120 |
| 7,129,883 B2 | 10/2006 | Muramatsu et al. | |
| 7,151,475 B2 * | 12/2006 | Boemler | 341/155 |
| 7,156,486 B2 | 1/2007 | Eguchi et al. | |
| 7,245,321 B2 * | 7/2007 | Panicacci et al. | 348/241 |
| 7,315,273 B2 | 1/2008 | Muramatsu et al. | |
| 7,330,146 B2 * | 2/2008 | Boemler | 341/163 |
| 7,375,672 B2 | 5/2008 | Muramatsu et al. | |
| 2004/0146154 A1 * | 7/2004 | Ahmadyar et al. | 379/229 |

(Continued)

FOREIGN PATENT DOCUMENTS

JP 2005-323331 A 11/2005

OTHER PUBLICATIONS

English language Abstract of JP 2005-323331 A (Nov. 17, 2005).

*Primary Examiner*—Jean B Jeanglaude
(74) *Attorney, Agent, or Firm*—Greenblum & Bernstein, P.L.C.

(57) ABSTRACT

A solid-state imaging device includes: pixel circuits arranged in a matrix which perform photoelectric conversion on received light; and an AD conversion unit converting the resultant signal voltage of the photoelectric conversion. The AD conversion unit includes: a reference voltage generation unit generating plural reference voltages which are different from each other within a possible range for a signal voltage; a most significant bit conversion unit that identifies a voltage section including the signal voltage from among the voltage sections each having a corresponding one of the reference voltages as a base point and determines the identified result as the value of the most significant bit of the digital signal; and a least significant bit conversion unit that converts, into the least significant bit of the digital signal, the difference voltage between the signal voltage and the reference voltage as the base point of the identified voltage section.

11 Claims, 25 Drawing Sheets

U.S. PATENT DOCUMENTS

2006/0158364 A1 * 7/2006 Boemler .................... 341/155
2007/0019091 A1 1/2007 Muramatsu et al.
2007/0046795 A1 3/2007 Yamashita
2008/0129851 A1 6/2008 Kasuga et al.

* cited by examiner

| SENSE1 | SENSE2 | SENSE3 | D11 | D10 |
|--------|--------|--------|-----|-----|
| 0 | 0 | 0 | 0 | 0 |
| 0 | 0 | 1 | 0 | 1 |
| 0 | 1 | 1 | 1 | 0 |
| 1 | 1 | 1 | 1 | 1 |

SOLID-STATE IMAGING DEVICE, SEMICONDUCTOR INTEGRATED CIRCUIT, AND SIGNAL PROCESSING METHOD

BACKGROUND OF THE INVENTION (1) Field of the Invention

The present invention relates to a solid-state imaging device, a semiconductor integrated circuit, and a signal processing method, and to a technique that converts an analogue signal obtained through photoelectric conversion into a digital signal.

(2) Description of the Related Art

In recent years, with a significant increase in number of pixels in a solid-state imaging device, demands for a technique that reads signals at high speed from the solid-state imaging device have been growing.

With an early structure where an analogue signal obtained through photoelectric conversion in a pixel circuit is read and sent outside a solid-state imaging device and converted into a digital signal using an external Analog Digital (AD) converter, an improvement in reading speed is limited due to a floating capacitance and the like inside the solid-state imaging device.

As a countermeasure to the above problem, a technique is known which converts an analogue signal obtained in a pixel circuit into a digital signal within the solid-state imaging device to suppress adverse effects such as the floating capacitance, thereby attaining speeding up signal output (See, for example, Patent Reference 1: Japanese Unexamined Patent Application Publication No. 2005-323331).

FIG. 25 is a schematic view illustrating a structure of main parts of a solid-state imaging device disclosed by Patent Reference 1. This solid-state imaging device converts a signal voltage obtained from a pixel circuit 92 into a digital signal through integral-type AD conversion. An operation of the solid-state imaging device will be roughly described.

The pixel circuit 92 in an imaging unit 91 applies, to one of input terminals of a voltage comparing unit 93, a signal voltage obtained through photoelectric conversion. A comparative signal generation unit 95 generates, by using a digital analog (DA) converter, a ramp wave RAMP which increases in synchronization with a clock signal CK provided by a control unit 94, and applies the ramp wave RAMP to the other one of the input terminals of the voltage comparing unit 93.

A counter unit 96 starts counting the clock signals CK simultaneously with the start of an increase of the ramp wave RAMP. When a signal indicating that a level of the ramp wave RAMP matches the signal voltage applied by the pixel circuit 92 is provided, the counter unit 96 outputs a count value as a digital signal indicating the signal voltage applied by the pixel circuit 92.

However, in order to obtain a digital signal at high speed with the conventional techniques, it is required to determine the time when the level of the ramp wave RAMP matches the signal voltage applied by the pixel circuit 92 in a short amount of time. For that reason, it is necessary to sweep the ramp wave RAMP at high speed by using a high-speed (in other words, high-frequency) clock signal CK.

A clock signal CK of 410 MHz frequency needs to be employed in order to obtain 12-bit digital output within 10 μs, for example. Further, in order to obtain 14-bit digital output, a clock signal CK of 1.6 GHz frequency needs to be employed.

Since it entails a high degree of technical difficulty to implement a circuit which operates stably under such a high-speed clock, practical application of the solid-state imaging device that allows both a multi-bit digital output and a high-speed output is difficult with the conventional technique.

SUMMARY OF THE INVENTION

The present invention has been conceived in view of the above-described circumstances, and aims to provide a solid-state imaging device capable of output a digital signal at high speed without having to use a high-speed (in other words, high-frequency) clock.

In order to solve the above described problem, the solid-state imaging device according to the present invention is structured as follows. The solid-state imaging device includes: a plurality of pixel circuits arranged in a matrix, each of which performs photoelectric conversion on a received light; and an AD conversion unit that converts a signal voltage into a digital signal represented as a plurality of bits, the signal voltage being a resultant of the photoelectric conversion. The AD conversion unit includes: a reference voltage generation unit that generates a plurality of reference voltages within a possible range for the signal voltage, each of the reference voltages being different from each other; a most significant bit conversion unit that identifies, from among a plurality of voltage sections, a voltage section that includes the signal voltage, and to determine a result of the identification as a value of a most significant bit of the digital signal, each of the voltage sections having a corresponding one of the reference voltages as a base point; and a least significant bit conversion unit which converts a difference voltage into a least significant bit of the digital signal, the difference voltage indicating a difference between the signal voltage and the reference voltage that is the base point of the identified voltage section.

With the above structure, it is possible to eliminate unnecessary conversion processing for the least significant bit in the voltage section that does not include the signal voltage. This makes it possible to convert the least significant bit in a narrow voltage section that corresponds to a resolution of the most significant bit, reducing a processing amount for converting the least significant bit compared to the case where the least significant bit is converted in all of the possible range for the signal voltage.

Further, the AD conversion unit may include a comparative signal generation unit that generates a comparative voltage that varies in a range between the reference voltages adjacent to each other and a count value that is updated as the comparative voltage varies, and the most significant bit conversion unit may identify a voltage section that includes the signal voltage by comparing the signal voltage in parallel with each of the reference voltages, output, as an offset voltage, the reference voltage that is the base point of the identified voltage section to the least significant bit conversion unit, and the least significant bit conversion unit may compare a difference voltage between the signal voltage and the offset voltage with the comparative voltage that varies, and to determine, as a least significant bit of the digital signal, the count value at a time when a result of the comparison is inverted.

With the above structure, conversion of the most significant bit is carried out in a short time that does not depend on the number of reference voltages, thereby making it possible to eliminate the time required for converting the least significant bit with both of the clock frequency used for converting the least significant bit and the resolution of the least significant bit maintained.

Further, the least significant bit conversion unit may include: a voltage composition circuit that generate a composite voltage by deducting the signal voltage from, and adding the comparative voltage to, the offset voltage, and output the generated composite voltage; and a buffer circuit which includes a plurality of inverters connected in series, the buffer circuit being applied with the composite voltage, and the least significant bit conversion unit may determine, as the least significant bit of the digital signal, the count value at a time when an output of the buffer circuit is inverted.

With the above structure, it is possible to convert the least significant bit by using the same comparative voltage in all of the plural voltage sections, thereby eliminating the need to generate plural comparative voltages each corresponding to one of the voltage sections and enabling conversion with high-accuracy without being affected by unevenness in characteristics of the plural comparative voltages.

Further, each of the inverters may be an NMOS transistor, and the least significant bit conversion unit may include a power down circuit which connects an input of each of the inverters to a fixed voltage subsequent to an invert of the output from the buffer circuit.

With the above structure, it is possible to reduce power consumption by suppressing a pass-through current of the NMOS inverter.

Further, the least significant bit conversion unit may include an amplifying circuit which amplifies the composite voltage, and the buffer circuit may be applied with the amplified composite voltage.

With the above structure, an error due to a minor voltage variation decreases comparatively since the composite voltage with an enlarged varied amount is processed in the buffer circuit, thereby increasing the accuracy for converting the least significant bit.

Further, the least significant bit conversion unit may include: a voltage composition circuit which generates a composite voltage by deducting the offset voltage from the signal voltage and outputs the generated composite voltage; and a comparison circuit which compares the composite voltage with the comparative voltage, and the least significant bit conversion unit may determine, as the least significant bit of the digital signal, the count value at a time when an output signal of the comparison circuit is inverted.

With the above structure, it is possible to convert the least significant bit by using the same comparative voltage in all of the plural voltage sections, thereby eliminating the need to generate plural comparative voltages each corresponding to one of the voltage sections and enabling conversion with high-accuracy without being affected by unevenness in characteristics of the plural comparative voltages.

Further, the AD conversion unit may include a comparative signal generation unit which generates a comparative voltage that varies in a range between the reference voltages adjacent to each other and a count value that is updated as the comparative voltage varies. The least significant bit conversion unit may compare a plurality of difference voltages between the signal voltage and each of the reference voltages in parallel with the comparative voltage that varies, and to determine, as the least significant bit of the digital signal, the count value at a time when one of results of the comparison is inverted, and the most significant bit conversion unit may identify a voltage section that includes the signal voltage by using the result of the comparison at a time when the least significant bit conversion unit starts the comparison operation.

This structure eliminates the need for including a dedicated comparator for converting the most significant bit. Further, the comparison operation for converting the least significant bit is carried out in parallel with plural voltage sections, so that the conversion time for the least significant bit is not longer than the conversion time in the case where the comparison operation is carried out in a single voltage section.

Further, the comparative signal generation unit may generate an enlarged comparative voltage that varies in a range that includes a predetermined margin added to the range between the reference voltages adjacent to each other, and the least significant bit conversion unit may obtain the least significant bit of the digital signal by comparing the difference voltage with the enlarged comparative voltage that varies.

With this structure, the comparison operation for converting the least significant bit is carried out by using the enlarged comparative voltage that varies in a greater range than the comparative voltage, thereby making it possible to prevent a fail in the conversion of the least significant bit such as the case where no match can be seen (the result of the comparison does not invert) within a variation range of the comparative voltage due to the effect of a minor voltage variation.

It is to be noted that the present invention can be embodied not only as a solid-state imaging device, but also as a semiconductor integrated circuit device and a signal processing method used in the solid-state imaging device.

As describe above, the solid-state imaging device according to the present invention generates mutually different reference voltages within a possible range for the signal voltage, determines, as a value of the most significant bit of the digital signal, a result of identifying, from among plural voltage sections, the voltage section that includes the signal voltage, and converts a difference voltage between the reference voltage that is the base point of the identified voltage section and the signal voltage into the least significant bit of the digital signal, thereby making it possible to eliminate unnecessary conversion processing of the least significant bit in the voltage section that does not include the signal voltage.

This makes it possible to convert the least significant bit in a narrow voltage section that corresponds to a resolution of the most significant bit, reducing a processing amount for converting the least significant bit compared to the case where the least significant bit is converted in all of the possible range for the signal voltage.

For example, in the case where the most significant bit is converted through flash-type AD conversion and the least significant bit is converted through single-slope AD conversion in a narrow voltage section that corresponds to a resolution of the most significant bit, the time required for converting the least significant bit can be reduced with both of the clock frequency used for converting the least significant bit and the resolution of the least significant bit maintained It is to be noted that, in the solid-state imaging device according to the present invention, the least significant bit may be converted by using a clock with a lower frequency. This eases temporal accuracy and response speed required for a signal related to conversion of the least significant bit, so that conversion accuracy may be easily increased. Further, an advantage of reducing power consumption of the apparatus can be obtained.

More specifically, the solid-state imaging device of the present invention has not only the advantage of reducing a conversion time but also the advantage of improving a trade-off between the conversion time and conversion accuracy and power consumption.

FURTHER INFORMATION ABOUT TECHNICAL BACKGROUND TO THIS APPLICATION

The disclosure of Japanese Patent Application No. 2008-041657 filed on Feb. 22, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

A solid-state imaging device according to an embodiment of the present invention is a solid-state imaging device which outputs a digital signal through AD conversion where a signal voltage obtained through photoelectric conversion performed by a pixel circuit is converted into a digital signal.

The solid-state imaging device of the present invention generates, within a possible range for the signal voltage, plural reference voltages each being different from each other, identifies a voltage section including the signal voltage from among plural voltage sections each having a corresponding one of the reference voltages as a base point, determines a result of the identification as a value of a most significant bit (MSB) of the digital signal, and converts a difference voltage between the reference voltage that is the base point of the identified voltage section and the signal voltage into a least significant bit (LSB) of the digital signal.

The solid-state imaging device according to an embodiment of the present invention will be described below with reference to the drawings.

A First Embodiment

Figure 1:
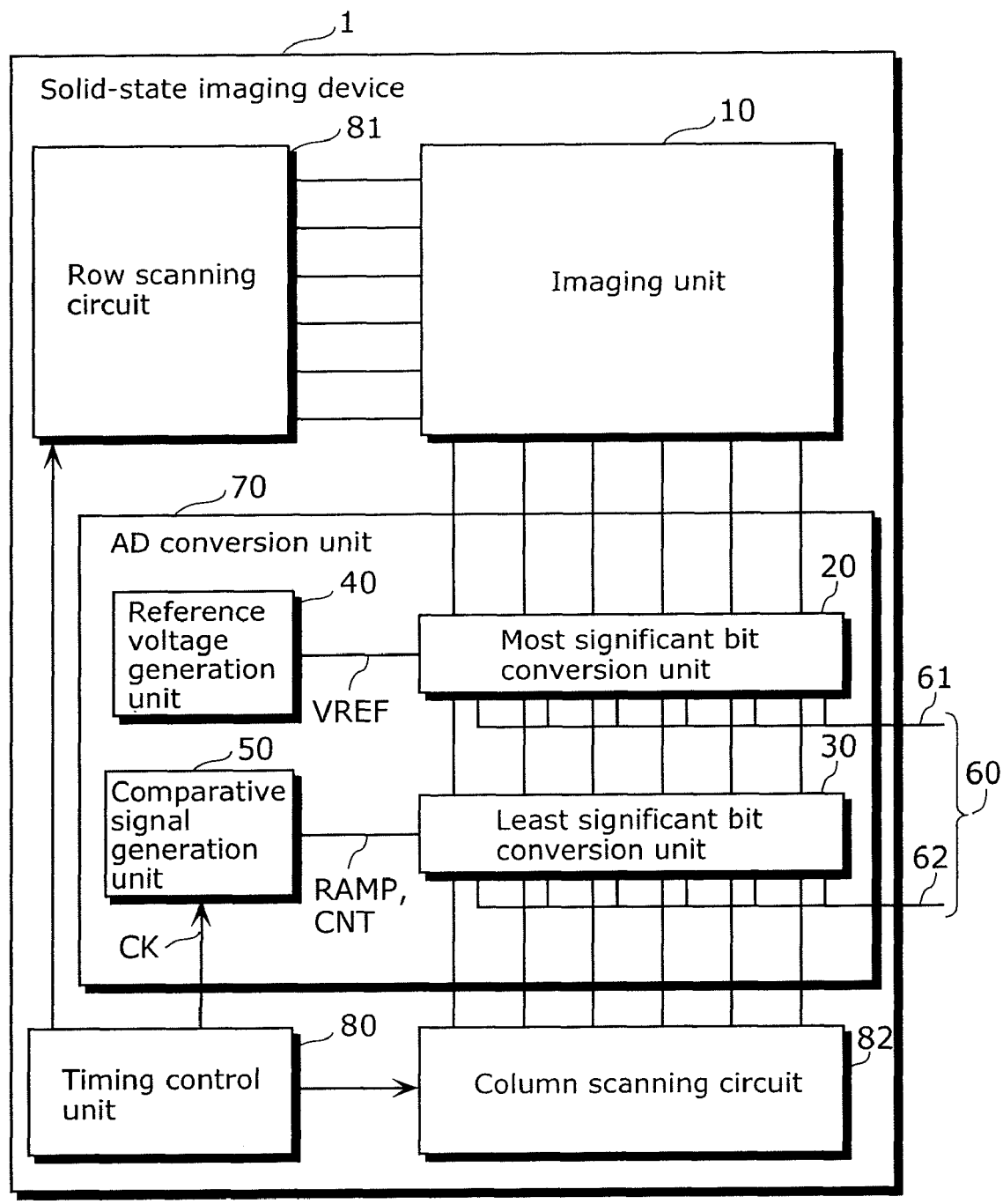
FIG. 1 is a block diagram which illustrates an example of a schematic structure of a solid-state imaging device according to a first embodiment.

FIG. 1 is a block diagram which illustrates an example of a schematic structure of a solid-state imaging device 1 according to a first embodiment.

As illustrated in FIG. 1, the solid-state imaging device 1 includes: an imaging unit 10; an AD conversion unit 70; a timing control unit 80; a row scanning circuit 81; a column scanning circuit 82; and output line 61.

The AD conversion unit 70 includes: a most significant bit conversion unit 20; a least significant bit conversion unit 30; a reference voltage generation unit 40; and a comparative signal generation unit 50. The output line 60 includes a most significant bit bus 61 and a least significant bit bus 62. Each of the units will be described later in detail with reference to FIG. 2.

It is to be noted that, FIG. 1 may be regarded as illustrating an arrangement of circuit blocks on a semiconductor substrate, that is, a floor layout, when the solid-state imaging device 1 is embodied as a semiconductor integrated circuit device, each of the circuit blocks corresponding to one of the units.

Figure 2:
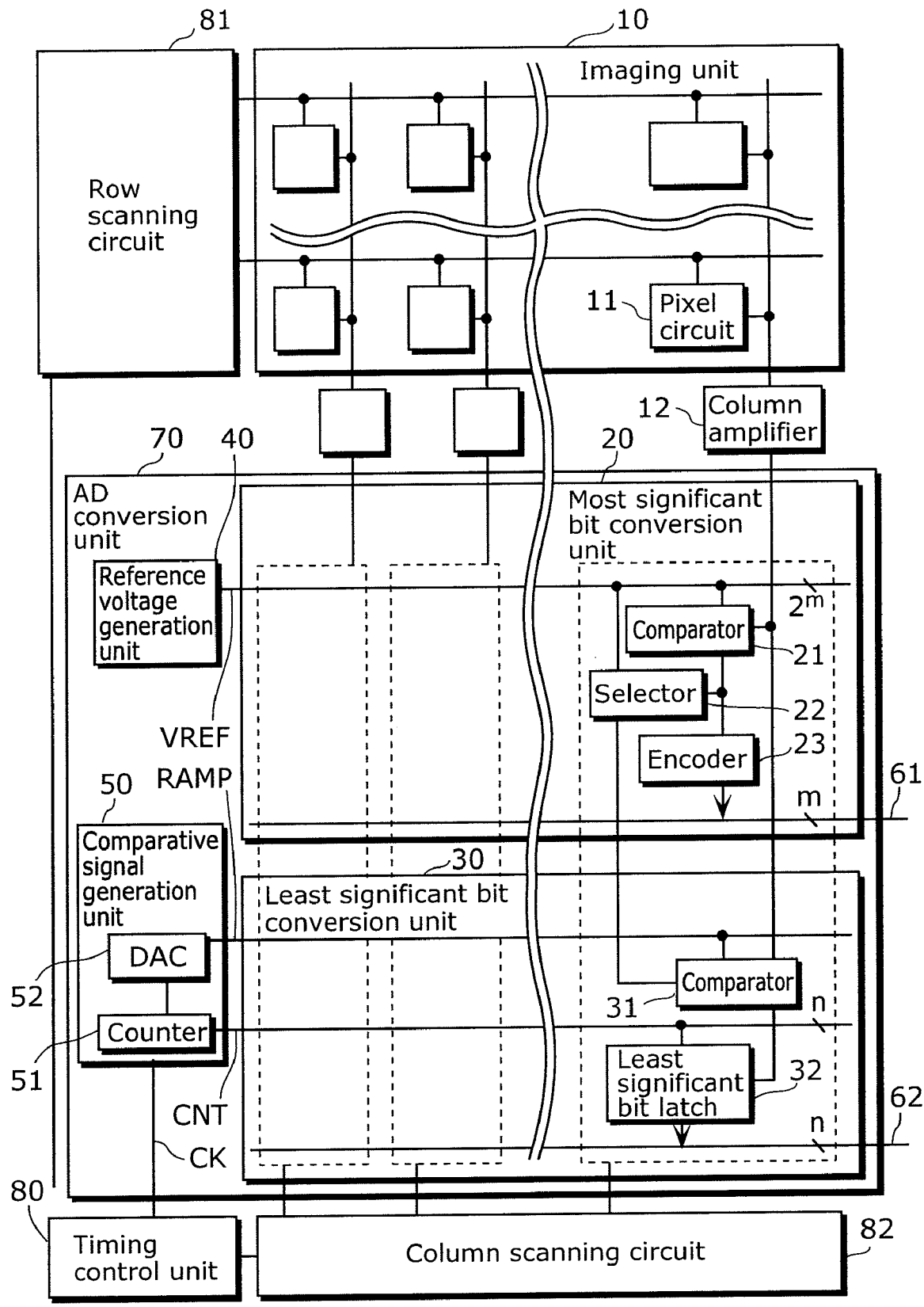
FIG. 2 is a block diagram which illustrates an example of a functional structure of the solid-state imaging device.

FIG. 2 is a block diagram which illustrates an example of a functional structure of the solid-state imaging device 1.

The imaging unit 10 is arranged in a matrix and includes plural pixel circuits 11 which photoelectrically convert received light. An electric signal obtained in the pixel circuit 11 through photoelectric conversion is amplified by a column amplifier 12 to be a signal voltage which can assume a predetermined voltage range In the AD conversion unit 70, the reference voltage generation unit 40 generates, within a voltage range that the signal voltage can assume, plural ($2^m$, for example) reference voltages VREF which are different from each other. The voltage range which the signal voltage can assume is divided, by the generated reference voltage VREF, into plural voltage sections each having a corresponding one of the reference voltages as a base point.

The most significant bit conversion unit 20 includes: a comparator 21; a selector 22; and an encoder 23. The comparator 21 compares the signal voltage in parallel with the plural reference voltages VREF. The selector 22 selects, using a result of the comparison, the reference voltage that is the base point of the voltage section including the signal voltage and outputs the selected reference voltage as an offset voltage to the least significant bit conversion unit 30. The encoder 23 encodes and outputs to the most significant bit bus 61 the result of the comparison so as to be the most significant bit.

The most significant bit conversion unit 20 is, what is called, a flash-type AD converter.

The comparative signal generation unit 50 includes a counter 51 and a DA converter (DAC) 52. The counter 51 generates a count value CNT of plural bits (n bits, for example) by counting a clock CK given by a timing control unit 80. The DA converter (DAC) 52 generates a comparative voltage RAMP that varies in a ramp wave form in a range between the reference voltages VREF adjacent to each other by converting the count value through analogue conversion.

The least significant bit conversion unit 30 includes a comparator 31 and a least significant bit latch 32. The comparator 31 compares a difference voltage between the signal voltage outputted from the column amplifier 12 and the offset voltage outputted from the selector 22 with the varying comparative voltage. The least significant bit latch 32 latches and outputs to the least significant bit bus 62 the count value CNT at the time when an output from the comparator 31 is inverted.

The least significant bit conversion unit 30 is, what is called, a single-slope AD converter.

The timing control unit 80 provides the comparative signal generation unit 50 with the clock CK, while providing the most significant bit conversion unit 20 and the least significant bit conversion unit 30 with control signals of different types described below. The timing control unit 80 further provides the row scanning circuit 81 and the column scanning circuit 82 with respectively predetermined timing signals. The row scanning circuit 81 causes the imaging unit 10 to operate row by row. The column scanning circuit 82 causes the digital signals obtained through AD conversion to be outputted column by column.

It is to be noted that, in the most significant bit conversion unit 20 and the least significant bit conversion unit 30 in FIG. 2, since the columns enclosed in broken lines are the same in the structure, only the right most column is illustrated with the structure.

A concept of AD conversion carried out in the solid-state imaging device 1 which is structured as described above will be explained by comparing with conventional single-slope AD conversion.

Figure 3B:
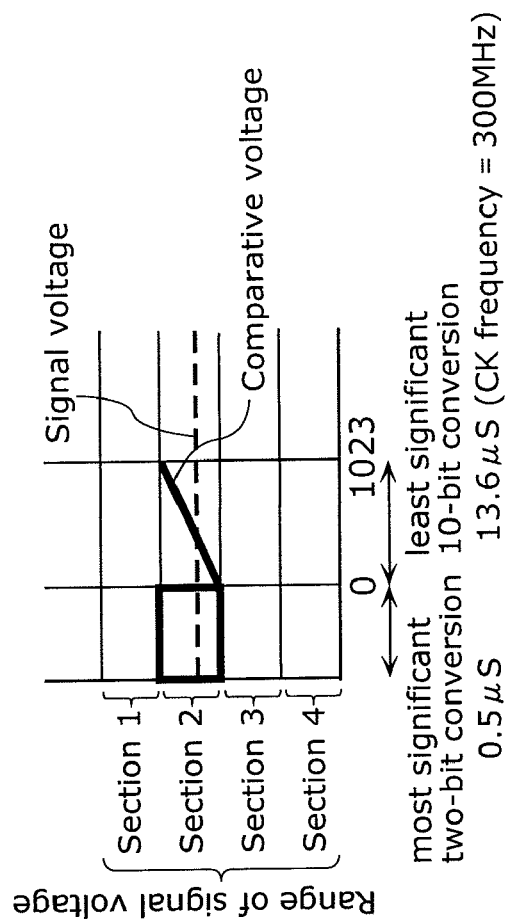
FIGS. 3A and 3B are diagrams which explain a basic concept of AD conversion.
Figure 3A:
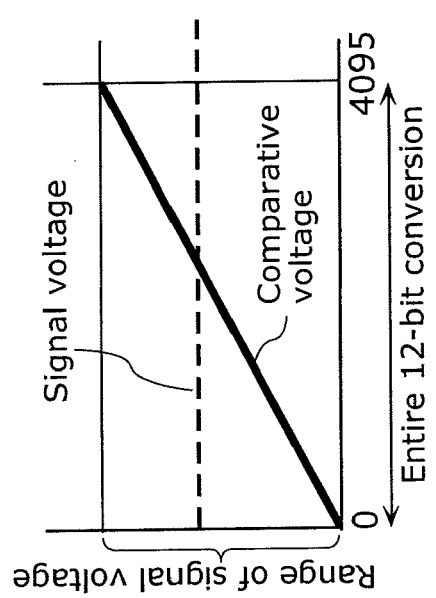

FIG. 3A is a conceptual diagram which explains an example of conventional single-slope AD conversion. In this example, 12-bit AD conversion is carried out by comparing a signal voltage with a comparative voltage that varies in the entire voltage range that the signal voltage can assume.

Here, digital conversion needs to be completed in 13.6 µs in order to output an image having pixels equivalent in number to a high-vision image at 60 fps, for example, FIG. 3B is a conceptual diagram which explains a concept of AD conversion carried out by the solid-state imaging device 1 according to the present embodiment.

In this example, the voltage range that the signal voltage can assume is divided into four voltage sections, the voltage section including the signal voltage is identified, and a result of the identification is converted into a most significant two bits. Then, a component of the signal voltage in the identified voltage section (in other words, the difference voltage between a voltage of the base point of the identified voltage section and the signal voltage) is converted into a least significant 10 bits through single-slope AD conversion by using a comparative voltage that varies only in a range of a single voltage section. With this, 12-bit AD conversion is carried out.

Figure 12:
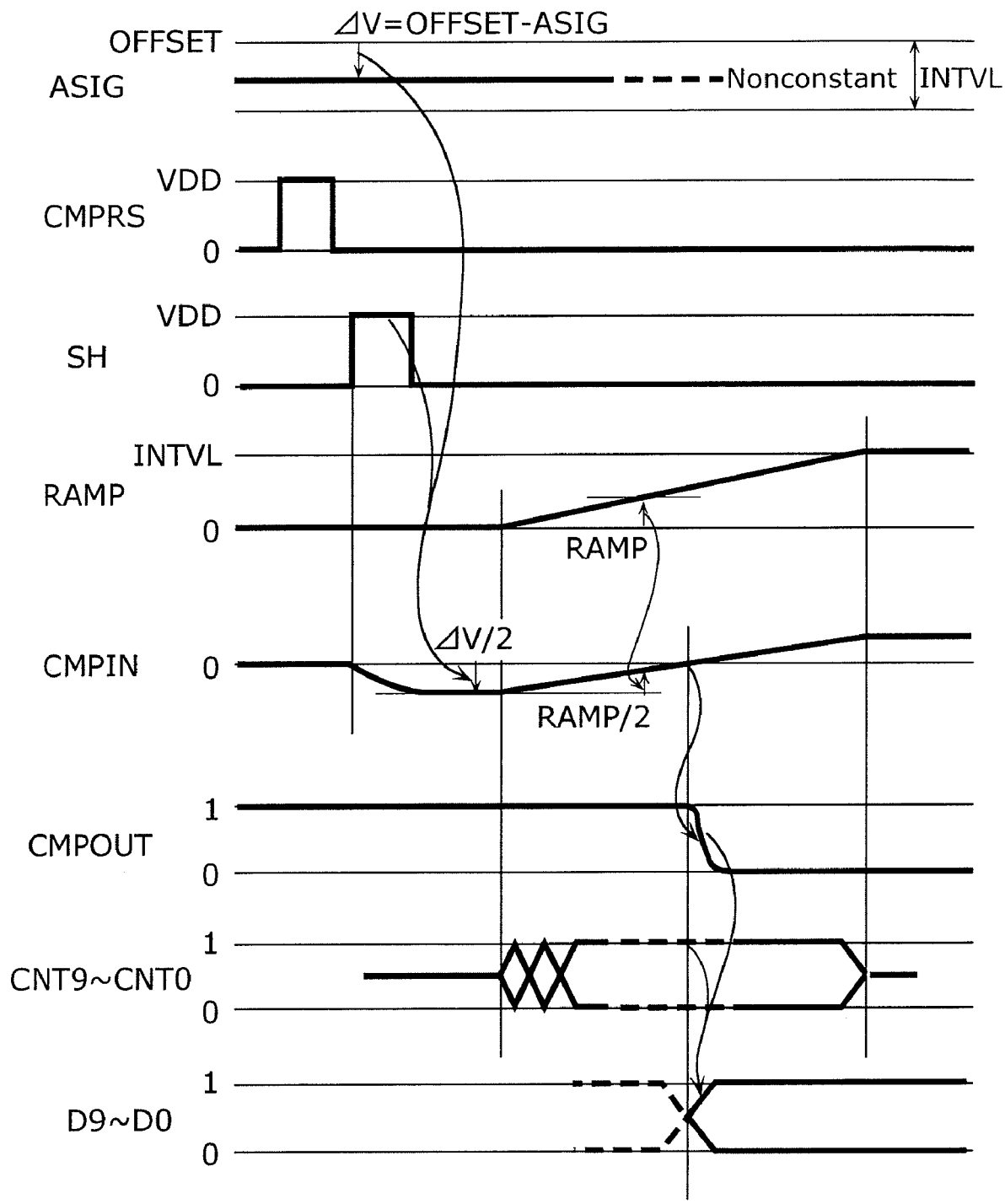
FIG. 12 is a timing diagram which illustrates an example of an operation of a least-significant-bit conversion unit.

Here, when a clock signal frequency is assumed to be 300MHz that is the same as in the conventional example of FIG. 3A, 12-bit digital conversion requires 0.5 µs for converting the most significant two bits and 3.5 µs for converting the least significant 10 bits, approximately. Therefore, it is possible to output an image having pixels equivalent in number to a high-vision image at 200 fps.

The structure of the solid-state imaging device 1 will be described more in detail below.

Figure 4:
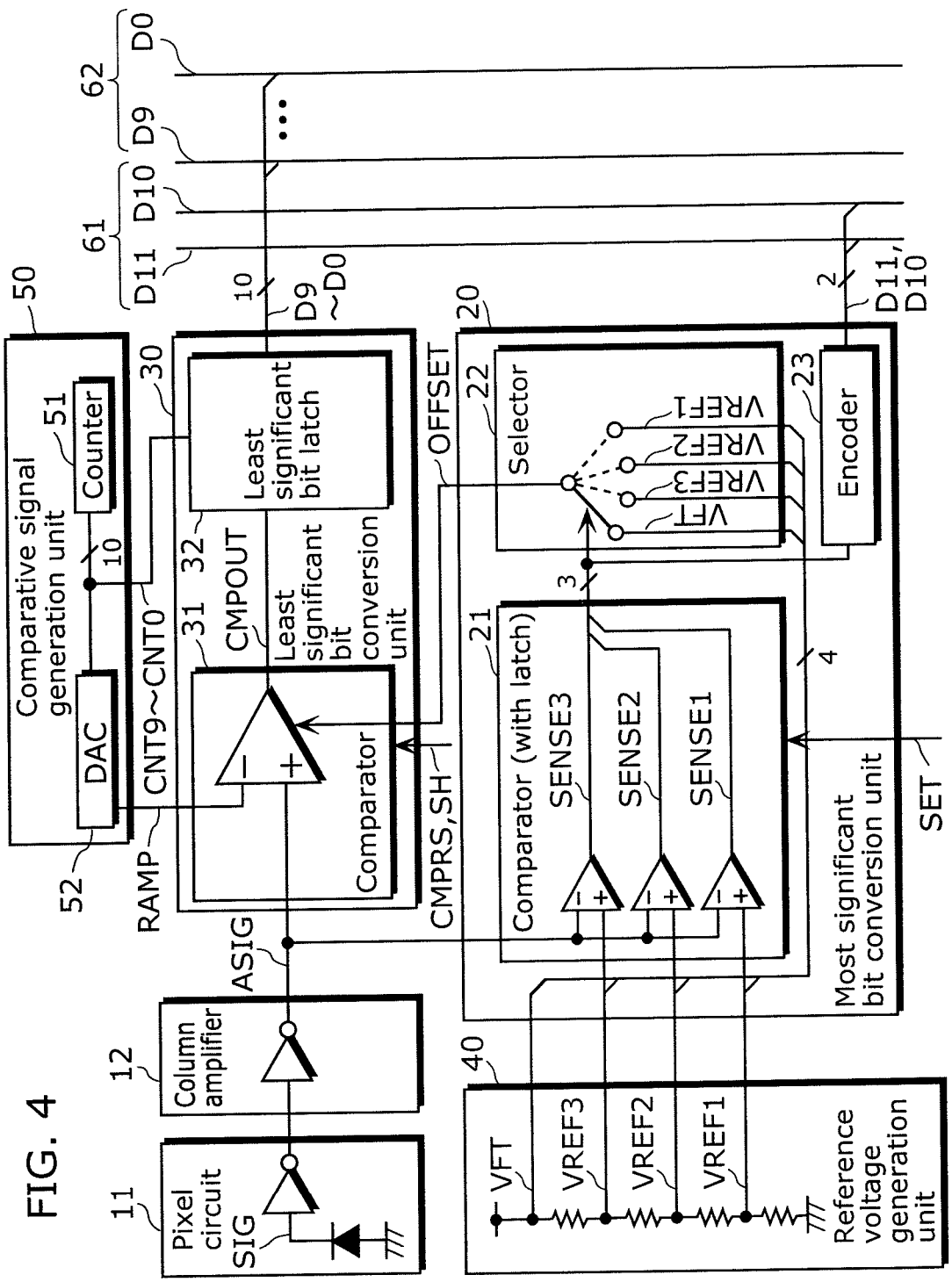
FIG. 4 is a block diagram which illustrates an example of a structure of a portion corresponding to a column of an AD conversion unit.

FIG. 4 is a block diagram which illustrates a portion for converting an analogue signal obtained from a single pixel to a digital signal in the solid-state imaging device 1. As to the most significant bit conversion unit 20 and the least significant bit conversion unit 30, only the portion corresponding to a single column (one of the portions enclosed in broken lines) is illustrated. It is also to be noted that some parts are illustrated with circuit symbols which typically represent internal functions.

An electric signal SIG obtained through photoelectric conversion in the pixel circuit 11 is amplified to a signal voltage ASIG by the column amplifier 12 that is an inverting amplifier.

In general, the electric signal SIG obtained through photoelectric conversion is a negative signal that becomes a lower voltage as the amount of light received is greater, and inversely amplified to a positive signal by an output amplifier in the pixel circuit 11 to be outputted. Thus, the signal voltage ASIG obtained by inversely amplifying an output signal of the pixel circuit 11 by the column amplifier 12 is negative.

It is assumed that the signal voltage ASIG can assume a voltage range, for example, which ranges from a minimum voltage 0 when receiving the maximum amount of light to a peak in the voltage (feed-through level) VFT when receiving no light.

The reference voltage generation unit 40 divides 0 and VFT which are voltages at the ends of the voltage range, so that four mutually different reference voltages VREF1 to VREF3 and VFT are generated within the voltage range. The voltage range that the signal voltage ASIG can assume is divided into four voltage sections, each of which has a corresponding one of the reference voltages VREF1 to VREF3 and VFT as an upper limit voltage. In this case, the upper limit voltage is the base point of respective voltage sections.

In the most significant bit conversion unit 20, the comparator 21 compares the signal voltage ASIG in parallel with each of the reference voltages VREF1 to VREF3 simultaneously, and latches a result of the comparison.

Figure 5:
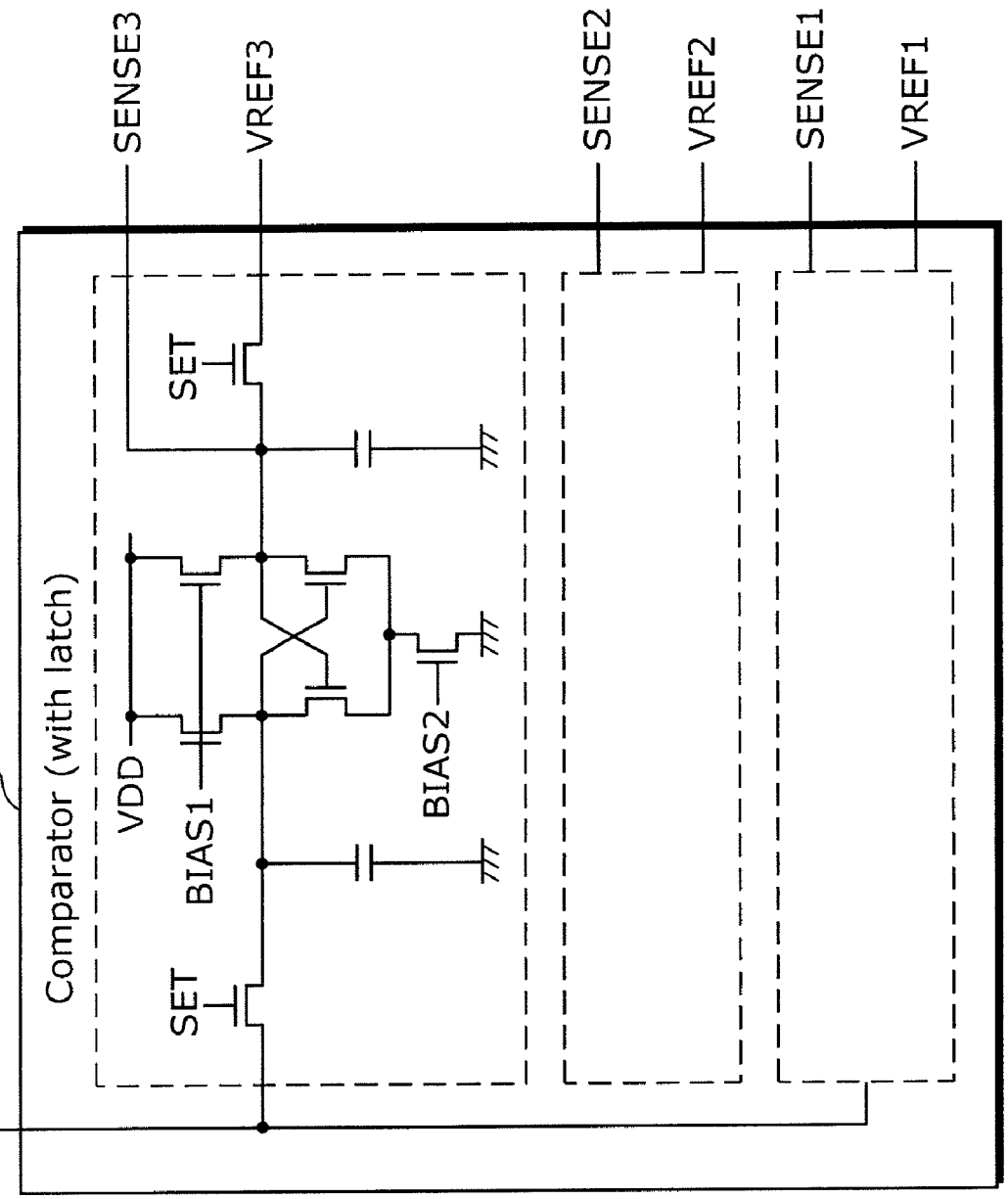
FIG. 5 is a circuit diagram which illustrates an example of a detailed structure of a comparator.

FIG. 5 is a circuit diagram which illustrates an example of a detailed structure of the comparator 21.

The comparator 21 as illustrated in FIG. 5 includes three sense amplifiers that compare the signal voltage ASIG with each of the reference voltages VREF1 to VREF3. Each portion enclosed in broken lines in FIG. 5 corresponds one of the sense amplifiers. Only the upper one of the sense amplifiers is illustrated since the three sense amplifiers have the same structure.

The sense amplifier amplifies a difference of voltages given to two input terminals, according to a control signal SET given by the timing control unit 80, to a saturated level (in other words, the level of the digital signal) through positive feedback, and latches a result of the amplification.

In the case where the two input terminals are provided with reference voltage VREF3 and the signal voltage ASIG, respectively, is when the reference voltage VREF3 is higher than the signal voltage ASIG, a voltage of the input terminal of the reference voltage VREF3 becomes even higher, a voltage of the input terminal of the signal voltage ASIG becomes even lower, and a result of the comparison SENSE3 that is latched to a high-level "1" as a digital signal is generated at the end. On the other hand, when the reference voltage VREF3 is lower than the signal voltage ASIG, a result of the comparison SENSE3 that is latched to a low-level "0" as a digital signal is generated at the end.

The high level and the low level as a digital signal are hereinafter simply indicated as "1" and "0", respectively.

A combination of "0" and "1" of the results of the comparison SENSES to SENSE3 obtained from the comparison identifies the voltage section that includes the signal voltage ASIG from among voltage sections each having a corresponding one of the reference voltages VREF1 to VREF3 and VFT as the base point (upper limit voltage).

The encoder 23 encodes the most significant bits D10 and D11 using the results of the comparison SENSE1 to SENSE3.

Figures 6A, 6B:
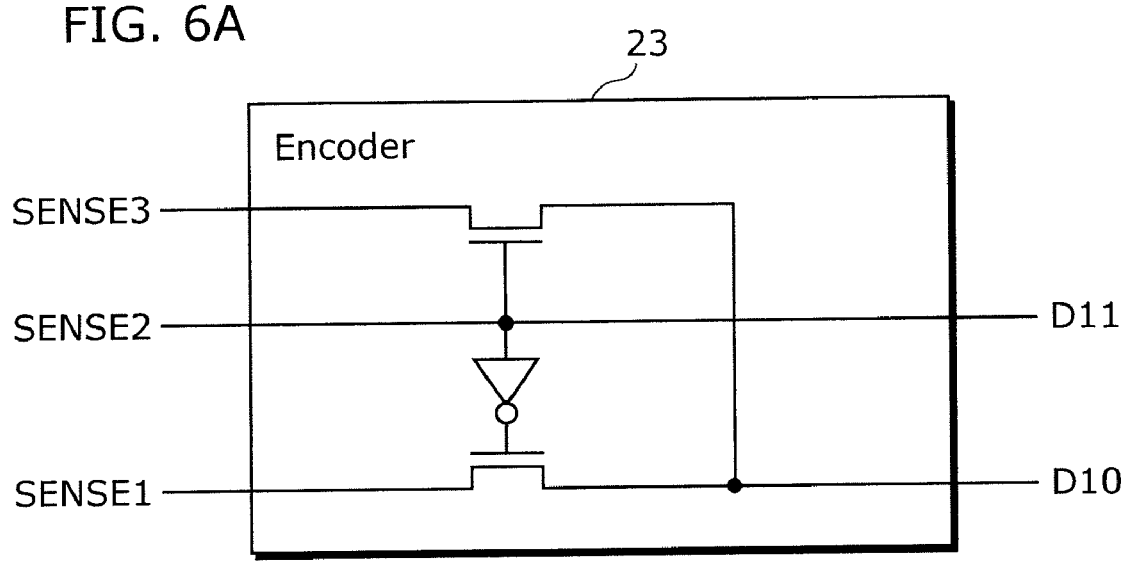
FIG. 6A is a circuit diagram which illustrates an example of a detailed structure of an encoder.
FIG. 6B is a diagram which illustrates an example of a truth table for the encoder.

FIG. 6A is a circuit diagram which illustrates an example of a detailed structure of the encoder 23. The encoder 23 outputs the most significant bits D10 and D11 according to the combinations of "0" and "1" of the results of the comparison SENSE1 to SENSE3, based on a table of truth value as illustrated in FIG. 6B.

The selector 22 selects a base point of the voltage section that includes the signal voltage ASIG from among reference voltages VREF1 to VREF3 and VFT, using the results of the comparison SENSE1 to SENSE3, and provides the least significant bit conversion unit 30 with the selected base point as an offset voltage OFFSET.

The offset voltage OFFSET is used in the least significant bit conversion unit 30 for converting difference voltage between the offset voltage OFFSET and the signal voltage ASIG into least significant bits D0 to D9.

Figure 7:
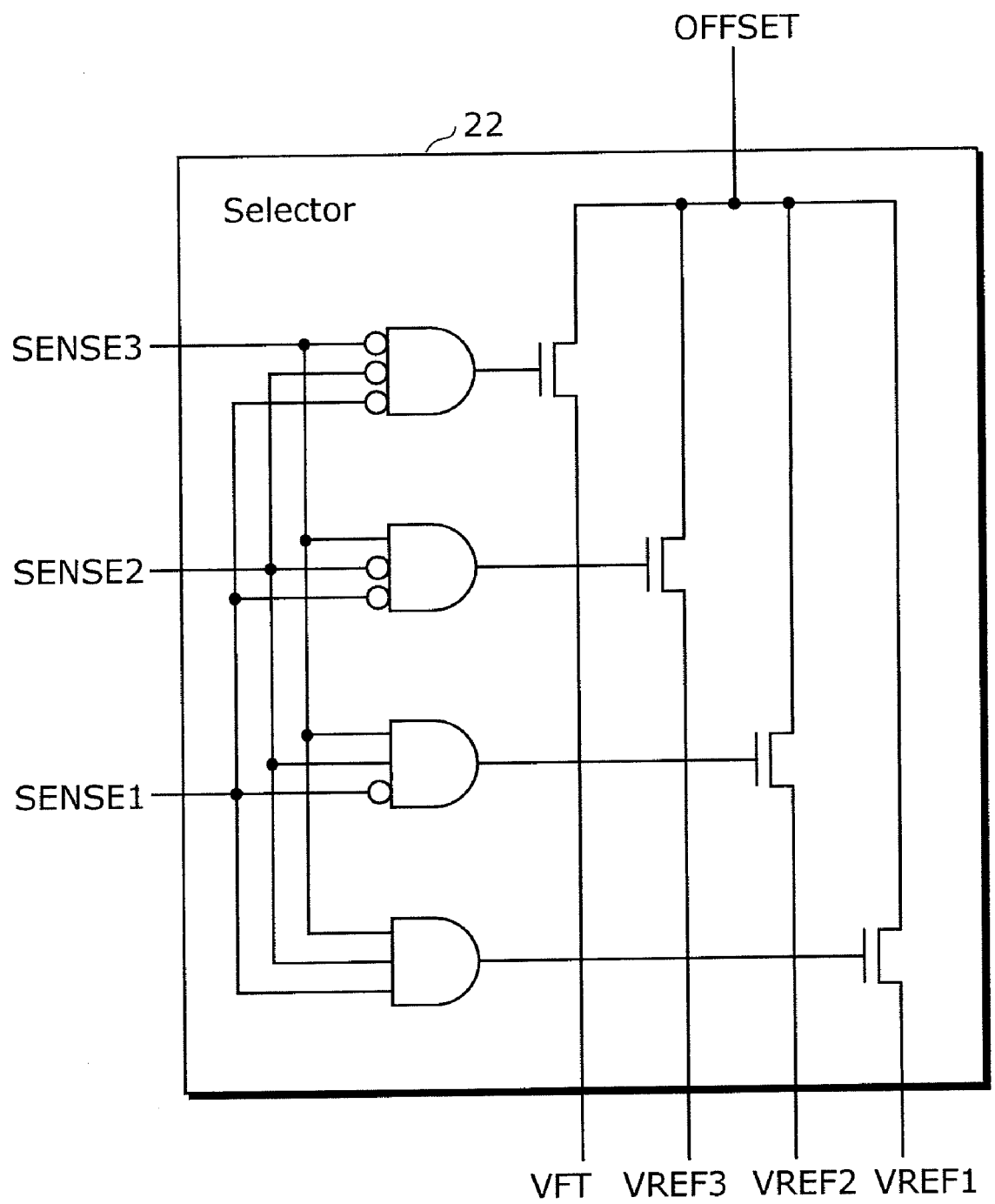
FIG. 7 is a circuit diagram which illustrates an example of a detailed structure of a selector.

FIG. 7 is a circuit diagram which illustrates an example of a detailed structure of the selector 22.

The selector 22 generates four selection signals by decoding combinations of "0" and "1" of the results of the comparison SENSE1 to SENSE3 indicated in the table of truth value in an AND circuit. Then, the selector 22 selects one of the reference voltages by turning on a corresponding switch connected to one of the reference voltages VREF1 to VREF3 and VFT, and outputs the selected reference voltage as the offset voltage OFFSET.

An example of an operation of the most significant bit conversion unit 20 structured as described above will be described with reference to a timing diagram.

Figure 8:
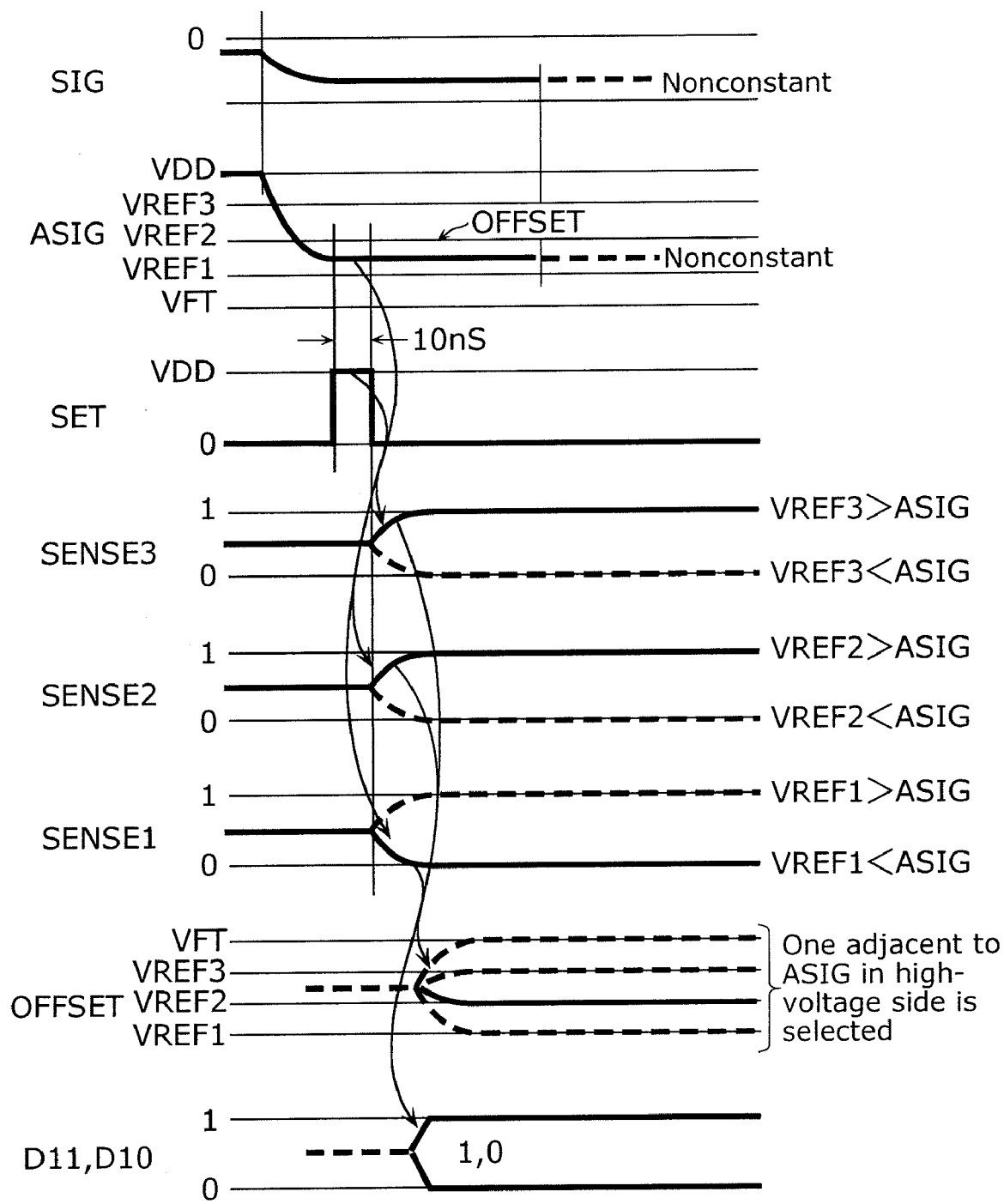
FIG. 8 is a timing diagram which illustrates an example of an operation of a most-significant-bit conversion unit.

FIG. 8 is a timing diagram which illustrates an example of the operation of the most significant bit conversion unit 20.

The electric signal SIG obtained in the pixel circuit 11 is amplified to the signal voltage ASIG by the column amplifier 12. The timing control unit 80 outputs the control signal SET at a predetermined timing, for example, a period of 10 nS, when the signal voltage ASIG is determined. With this, the signal voltage ASIG and the reference voltages VREF1 to VREF3 are given to the comparator 21. The comparator 21 is temporarily kept balanced during output of the control signal SET, and the results of the comparison SENSE1 to SENSE3 is latched to either "0" or "1" after the control signal SET stopped.

Then, according to the latched results of the comparison SENSE1 to SENSE3, the selector 22 selects, as the offset voltage OFFSET, the base point of the voltage section that includes the signal voltage ASIG (here, the one adjacent to the signal voltage ASIG in a high-voltage side) from among the reference voltages VREF1 to VREF3 and VFT, and the encoder 23 determines a value of the most significant bits D11 and D10.

Next, description for the rest of FIG. 4 will be given in detail.

In the comparative signal generation unit 50, a counter 51 counts the clock CK given from the timing control unit 80 and outputs, for example, 10-bit count values CNT0 to CNT9. A DAC 52 generates a comparative voltage RAMP in a form of a ramp wave by converting the count values CNT0 to CNT9 through analogue conversion.

In the least significant bit conversion unit 30, the comparator 31 compares a difference voltage between the signal voltage ASIG outputted from the column amplifier 12 and the offset voltage OFFSET outputted from the selector 22 with the comparative voltage RAMP outputted from the DAC 52.

Figure 9:
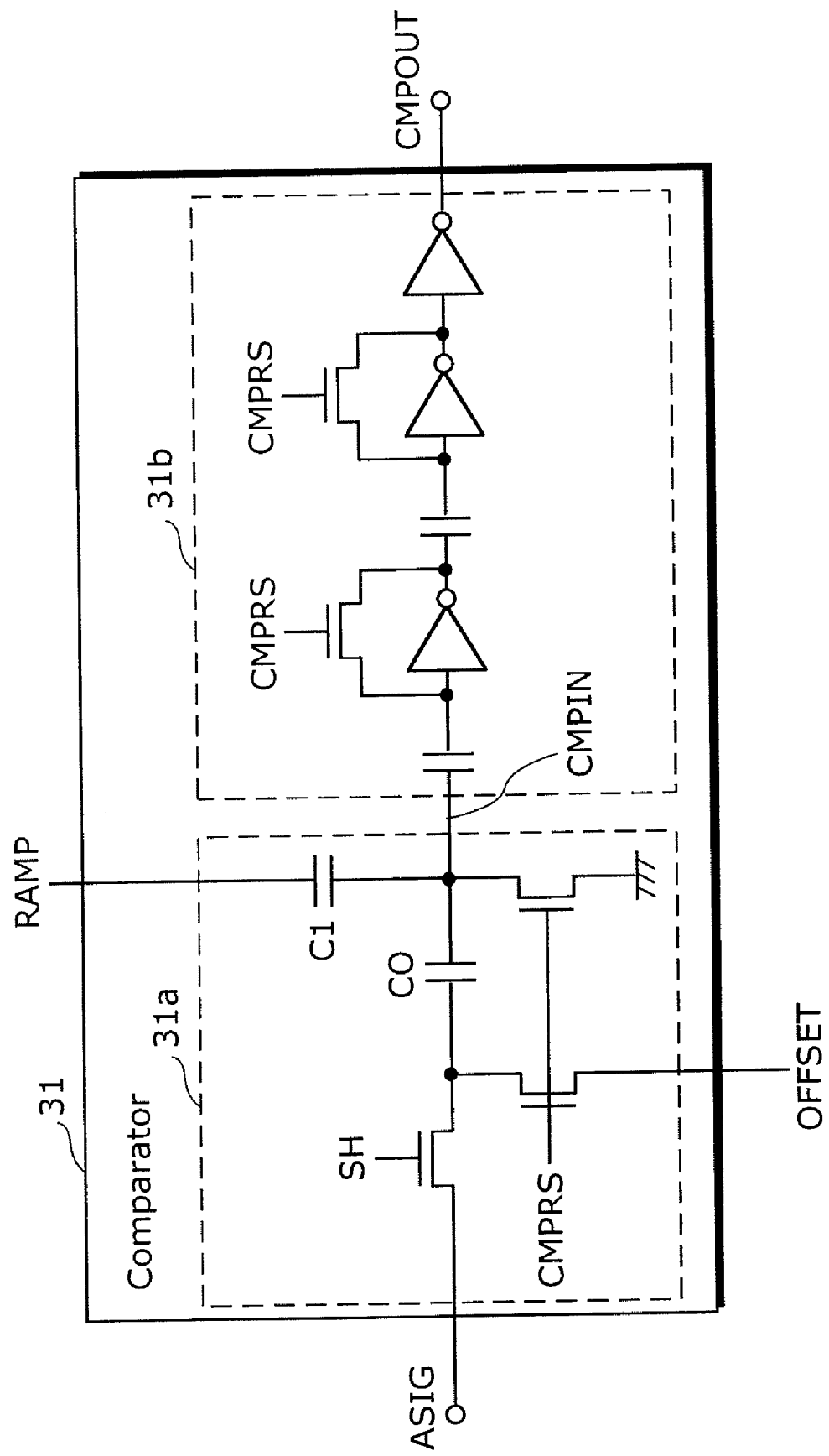
FIG. 9 is a circuit diagram which illustrates an example of a detailed structure of a comparator.

FIG. 9 is a circuit diagram which illustrates an example of a detailed structure of the comparator 31.

The comparator 31 illustrated in FIG. 9 includes a voltage composition circuit 31*a* and a buffer circuit 31*b*.

The voltage composition circuit 31*a* is a circuit that generates, at a connecting point of two capacitors C0 and C1 which are connected in series, a composite voltage CMPIN obtained by composing the offset voltage OFFSET, the signal voltage ASIG, and the comparative voltage RAMP by reallocating electric charges.

More specifically, the capacitor C0 is charged to the offset voltage OFFSET via the switch that is turned on with the control signal CMPRS given from the timing control unit 80 and the capacitor C1 is discharged at the same time, and then the signal voltage ASIG is applied to the capacitor C0 via the switch that is turned on with the control signal SH.

At this time, when it is assumed that the capacitors C0 and C1 are the same capacity, the composite voltage CMPIN decreases from an initial voltage by (OFFSET−ASIG)/2. More specifically, a difference voltage between the offset voltage OFFSET and the signal voltage ASIG is generated as a varied amount of the composite voltage CMPIN.

Then, when the comparative voltage RAMP to be applied to the capacitor C1 increases, the composite voltage CMPIN increases by RAMP/2, which is half the voltage amount of increase of the comparative voltage RAMP.

The buffer circuit 31*b* includes three inverter connected in series and amplifies and outputs the composite voltage CMPIN.

When a threshold voltage of the buffer circuit 31*b* matches the initial voltage of the composite voltage CMPIN, an output signal CMPOUT of the buffer circuit 31*b* is inverted when the composite voltage CMPIN returns to the initial voltage.

With this, the output signal CMPOUT obtains a result of the comparison of the difference voltage between the offset voltage OFFSET and the signal voltage ASIG with the comparative voltage RAMP.

It is to be noted that the buffer circuit 31*b* makes a rise and a fall of the output signal CMPOUT steep by amplifying the composite voltage CMPIN with approximately 1000 times gain, thereby speeding up a response.

It is to be noted that a modification example where a power saving function is added to the comparator 31 may be applicable.

Figure 10:
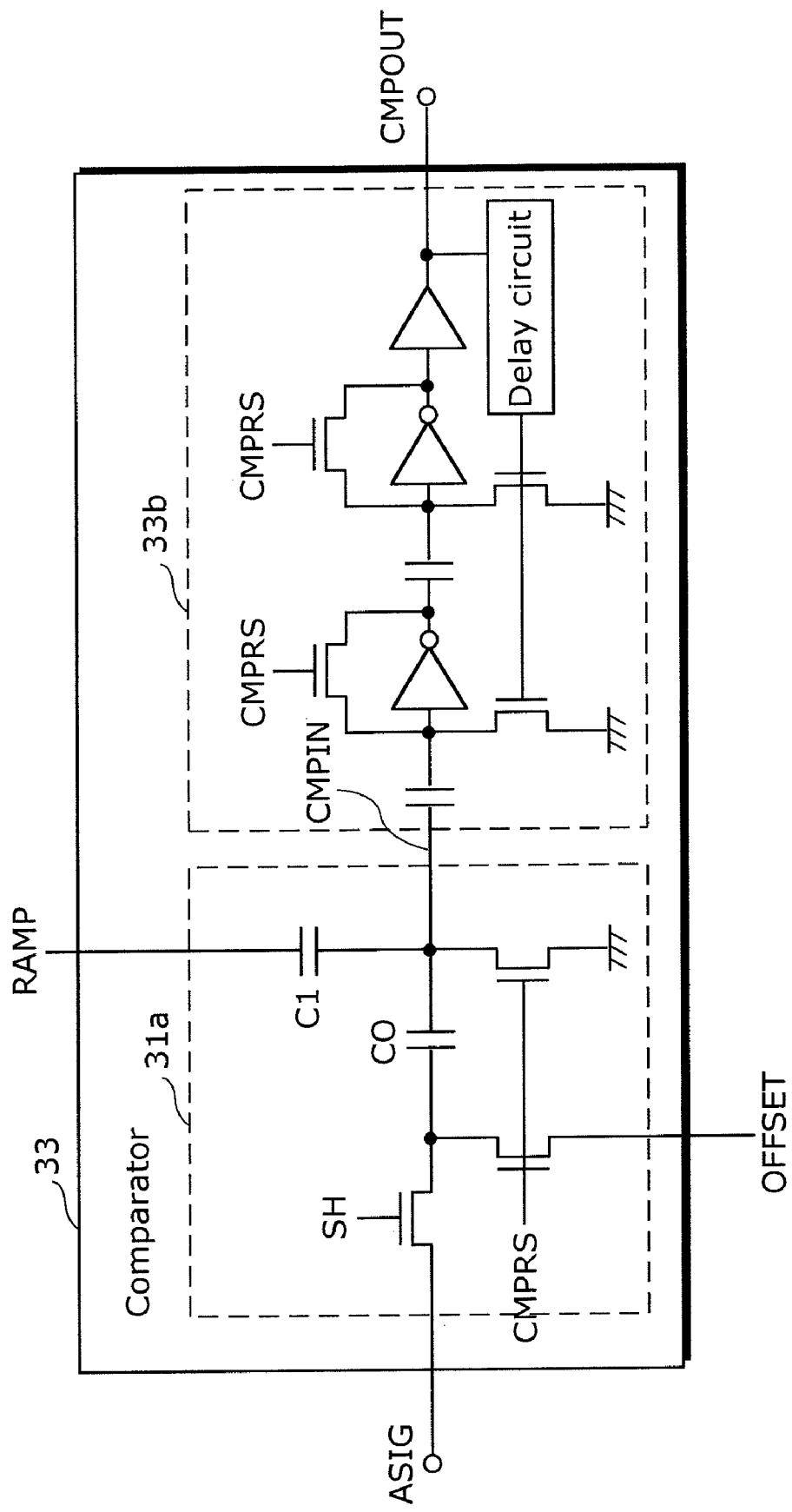
FIG. 10 is a circuit diagram which illustrates another example of a detailed structure of the comparator.

FIG. 10 is a circuit diagram which illustrates an example of a detailed structure of such a comparator 33.

The comparator 33 as illustrated in FIG. 10 includes the voltage composition circuit 31a as described above and a buffer circuit 33b to which a power saving function is added. The buffer circuit 33b has a function that saves power, in the case where an internal inverter is made up of a NMOS transistor only, by suppressing a pass-through current of the inverter.

Compared to the buffer circuit 31b, the buffer circuit 33b additionally includes a power down circuit that connects an input from the inverter to a fixed voltage so as to prevent the pass-through current after a predetermined delay time has passed subsequent to the inversion of the output signal CMPOUT.

Figure 11:
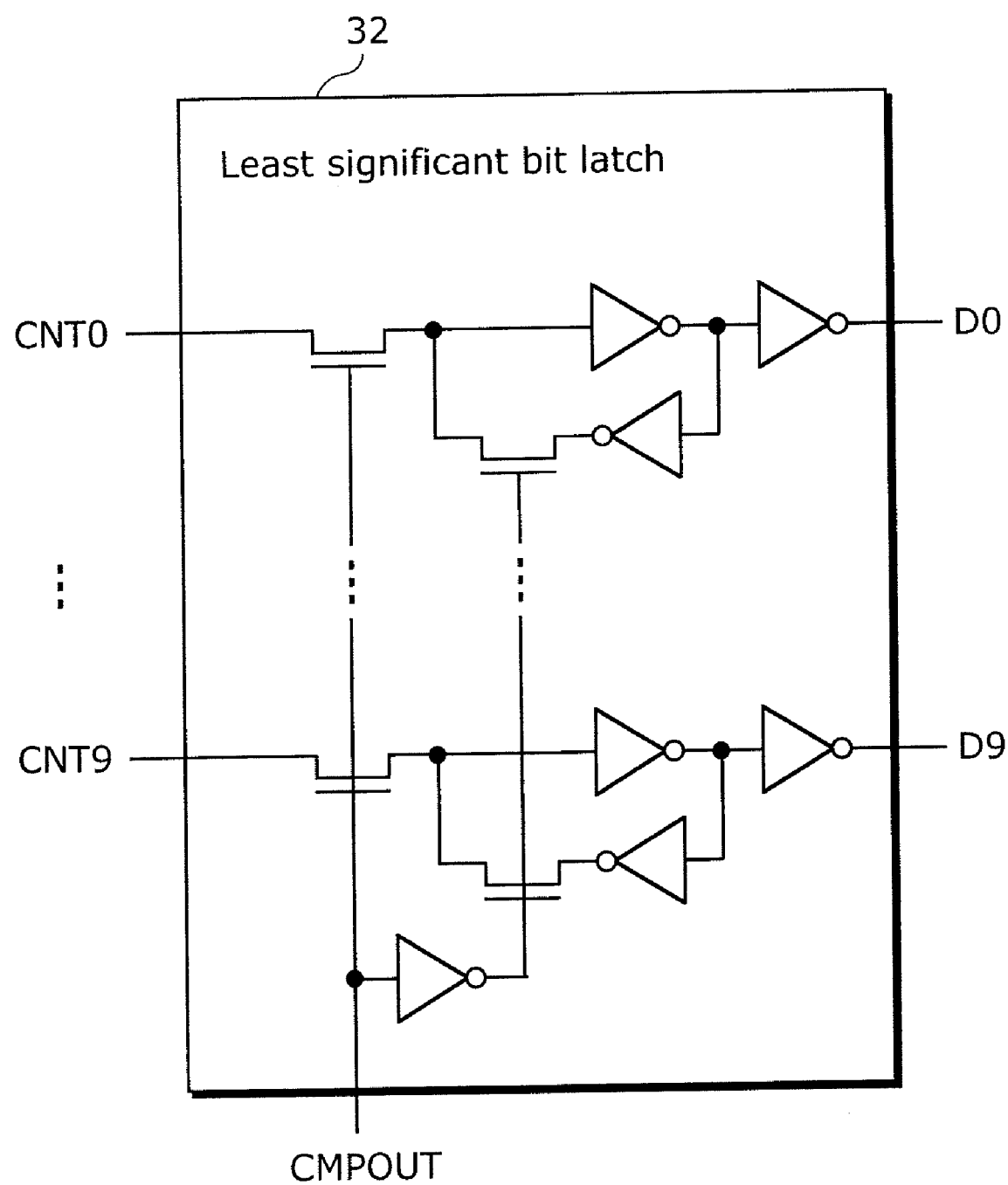
FIG. 11 is a circuit diagram which illustrates an example of a detailed structure of a least-significant-bit latch.

FIG. 11 is a circuit diagram which illustrates an example of a detailed structure of the least significant bit latch 32.

The least significant bit latch 32 as illustrated in FIG. 11 includes a latch circuit where two inverters circularly connected for every bit and an input switch that inputs the count values CNT0 to CNT9 to the latch circuit. When the level of the output signal CMPOUT of the comparator 31 becomes low, the input switch is turned off and the count values CNT0 to CNT9 at that time are latched at the latch circuit.

FIG. 12 is a timing diagram which illustrates an example of the operation of the most significant bit conversion unit 30. To make the description clear and concise, an initial voltage of the composite voltage CMPIN and a threshold voltage of the buffer circuit 31b are both assumed to be 0.

The signal voltage ASIG is in between the reference voltage selected as the offset voltage OFFSET and the adjacent reference voltage on the side of lower voltage, and is determined to be the voltage as $\Delta v$ lower than the offset voltage OFFSET. Here, the width of the space between the reference voltages adjacent to each other is indicated as INTVL.

When given the control signal CMPRS and SH from the timing control unit 80, the composite voltage CMPIN decreases by $\Delta v/2$ from the initial voltage 0 to be (OFFSET−ASIG)/2.

Then, the count values CNT0 to CNT9 are updated according to the clock CK outputted from the timing control unit 80, and the comparative voltage RAMP increases in a range INTVL between the reference voltages adjacent to each other. The composite voltage CMPIN is added half the amount of increase in the comparative voltage RAMP to be—(OFFSET−ASIG)/2+RAMP/2.

Subsequently, when the composite voltage CMPIN returns to the initial voltage 0, that is, when becoming—(OFFSET−ASIG)/2+RAMP/2≧0 becomes true, the output signal CMPOUT of the comparator 31 is inverted and the count values CNT0 to CNT9 are latched as the least significant bits D0 to D9.

Subsequently, when the composite voltage CMPIN returns to the initial voltage 0, that is, when becoming—(OFFSET−ASIG)/2+RAMP/2≧0 becomes true, the output signal CMPOUT of the comparator 31 is inverted and the count values CNT0 to CNT9 are latched as the least significant bits D0 to D9.

As describe above, the solid-state imaging device according to the present invention generates mutually different reference voltages within a voltage range that a signal voltage can assume, determines, as a value of the most significant bit of the digital signal, a result of identifying, from among plural voltage sections each having a corresponding one of the reference voltages as the base point, the voltage section that includes the signal voltage, and converts the difference voltage between the reference voltage that is the base point of the identified voltage section and the signal voltage into the least significant bit of the digital signal. Therefore, it is possible to omit unnecessary conversion processing of the least significant bit in the voltage section that does not include the signal voltage.

The above structure makes it possible to convert the least significant bit in a narrow voltage section that corresponds to a resolution of the most significant bit, reducing a processing amount for converting the least significant bit compared to the case where converting processing of the least significant bit is carried out in all of the voltage ranges that the signal voltage can assume.

In particular, in the case where the most significant bit is converted through flash-type AD conversion and the least significant bit is converted through single-slope AD conversion in a narrow voltage section that corresponds to a resolution of the most significant bit, as in the solid-state imaging device 1 according to the first embodiment, time required for converting the least significant bit can be reduced with both of the clock frequency used for converting the least significant bit and the resolution of the least significant bit maintained.

It is to be noted that the least significant bit may be converted by using a clock having a lower frequency in the solid-state imaging device 1. This eases temporal accuracy and a response speed required for a signal related to conversion of the least significant bit, so that conversion accuracy can be easily increased. Further, an advantage of reducing power consumption of the apparatus can be obtained.

For example, the case is considered in which the solid-state imaging device 1 achieves a conversion time equivalent to the conventional case in which all of the bits are converted by a single-slope AD conversion unit. In the solid-state imaging device 1, the most significant bit is converted by the most significant bit conversion unit 20 that is a flash-type AD conversion unit in a short time that does not depend on the number of voltage sections. Therefore, when $2^m$ voltage section are provided, it is possible to reduce the clock frequency used for converting the least significant bit to approximately $\frac{1}{2^m}$ of the conventional clock frequency.

More specifically, the solid-state imaging device of the present invention has not only the advantage of reducing a conversion time but also the advantage of improving a trade-off between the conversion time and conversion accuracy and power consumption.

It is to be noted that a modification example of alleviating comparison accuracy required for the buffer circuit 31b of the comparator 31 may also be applicable.

As described above, since the voltage composition circuit 31a of the comparator 31 composes the composite voltage CMPIN from the offset voltage OFFSET, the signal voltage ASIG, and the comparative voltage RAMP by reallocating electric charges of two capacitors C0 and C1 which are connected in series, when assuming the capacitors C0 and C1 are the same amount, a varied amount of the composite voltage CMPIN is half the difference voltage between the offset voltage OFFSET and the signal voltage ASIG, and half the varied amount of the comparative voltage RAMP.

The varied amount of the composite voltage CMPIN is reduced as described above, the buffer circuit 33b is required a high degree of comparison accuracy for comparing the composite voltage CMPIN and a threshold value.

For the above reason, an amplifier that amplifies the composite voltage CMPIN is inserted between the voltage composition circuit 31a and the buffer circuit 31b.

Figure 13:
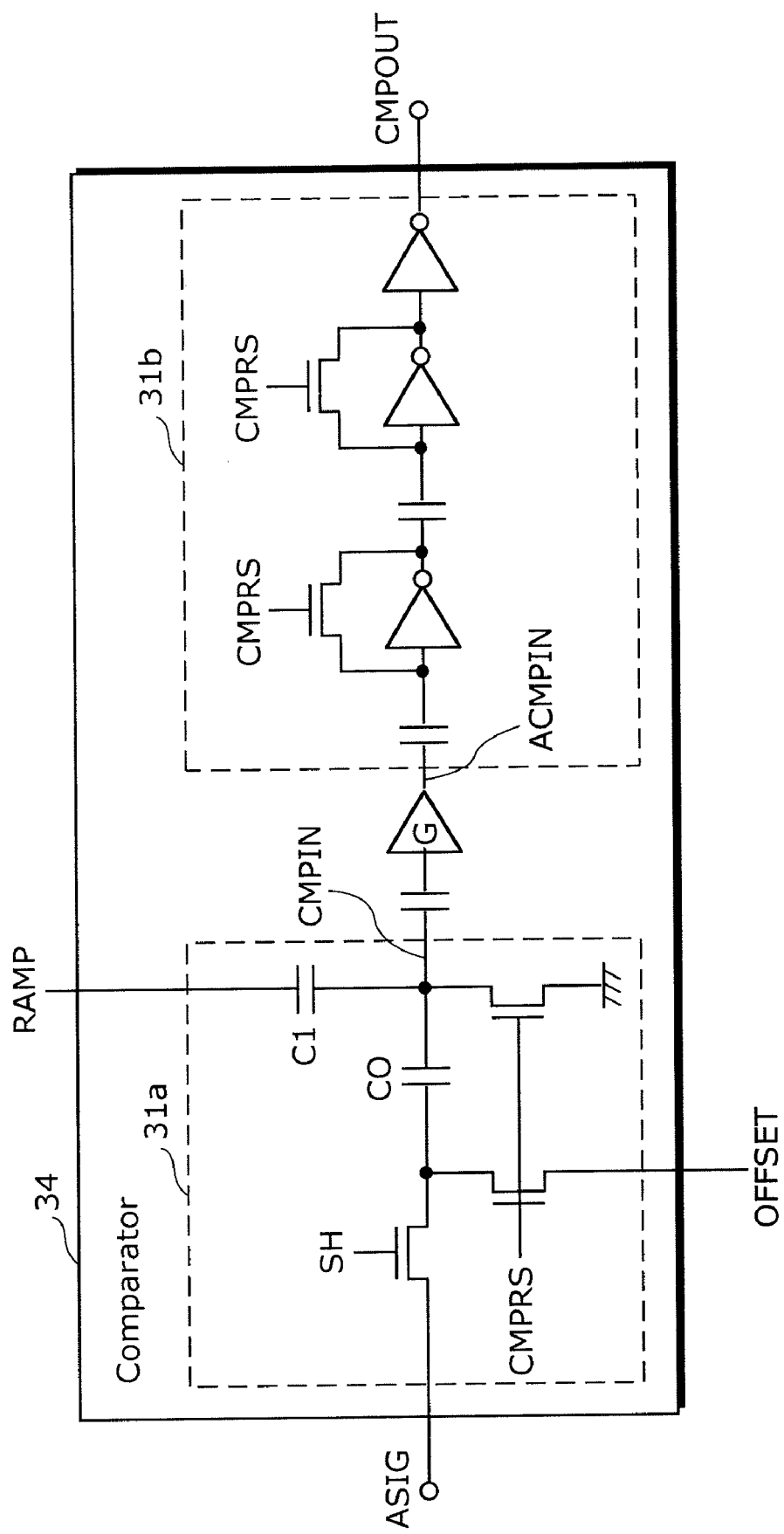
FIG. 13 is a circuit diagram which illustrates an example of a detailed structure of a comparator in accordance with a modification.

FIG. 13 is a circuit diagram which illustrates an example of a detailed structure of the comparator 34 of the modification example.

Compared to the buffer circuit 31 (FIG. 9), the buffer circuit 34 additionally includes an amplifier that amplifies the composite voltage CMPIN by G times to gain and proved to the buffer circuit 31b an amplified composite voltage ACMPIN.

Figure 14:
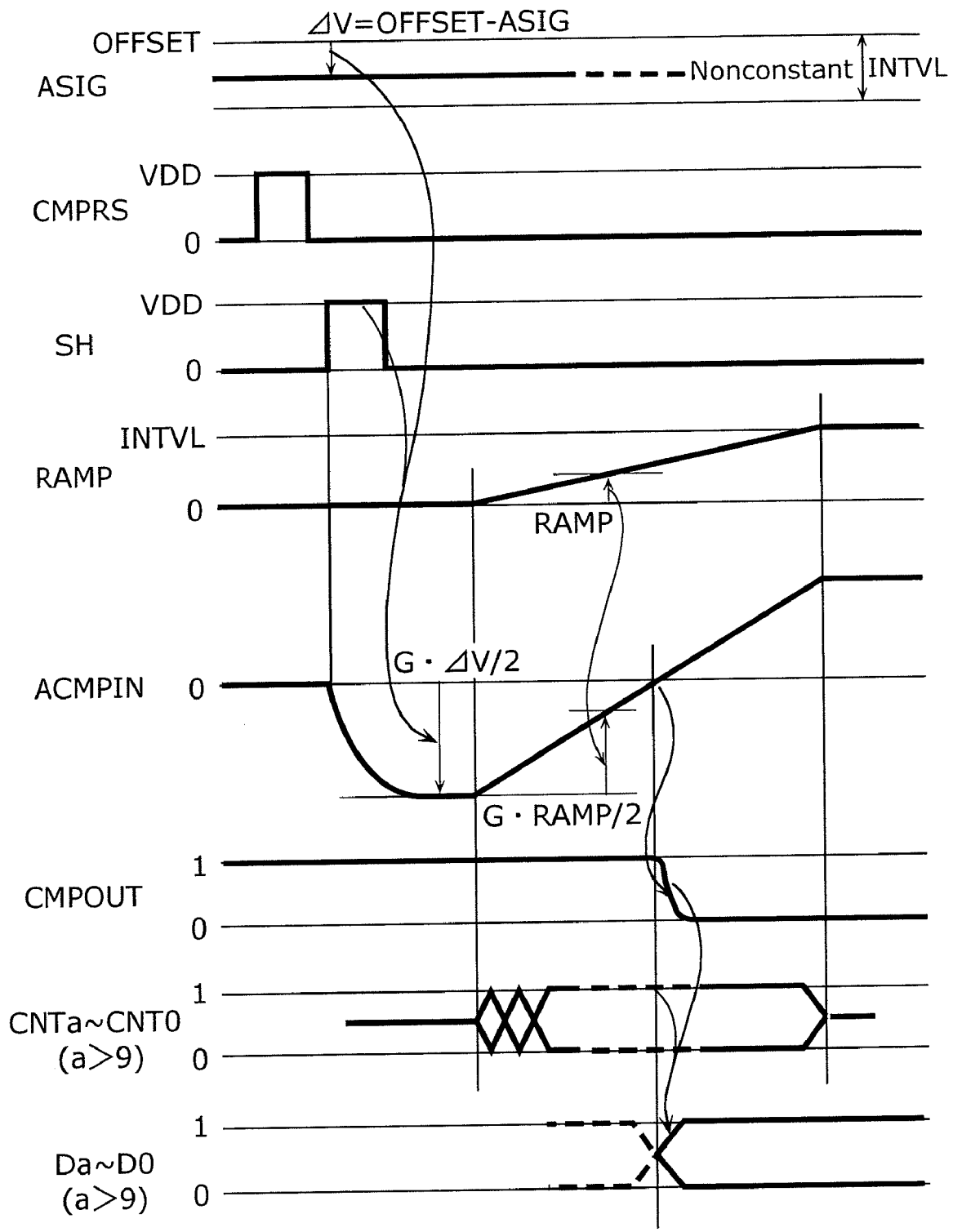
FIG. 14 is a timing diagram which illustrates an example of an operation of a comparator in accordance with a modification.

FIG. 14 is a timing diagram which illustrates an example of an operation of the comparator 34 in accordance with the modification example.

This timing diagram is different from the timing diagram of FIG. 12 where the composite voltage CMPIN is processed without amplification, in that the amplified composite voltage ACMPIN is compared with the threshold value and a result of the comparison is outputted as an output signal CMPOUT.

As described above, a threshold value accuracy required to the buffer circuit 31b is eased by using the voltage having an enlarged varied amount for comparing the threshold value. Further, the resolution of the least significant bit can be improved without increasing comparison accuracy of the buffer circuit 31b, by increasing the number of bits of the count value to be, for example, more than ten as illustrated in FIG. 14. In the case where the number of the least significant bit is maintained, a voltage width corresponding to the resolution of the least significant bit is enlarged and an error due to a minor voltage variation decreases comparatively, resulting in an improve in the conversion accuracy of the least significant bit.

It is to be noted that, when a minor voltage variation occurs in the case where the signal voltage ASIG is significantly close to one of the comparative voltages VREF1 to VREF3 and VFT, conversion of the least significant bit may sometimes fail.

For example, when the signal voltage VREF moves to a different voltage section after the voltage section that includes the signal voltage VREF is identified, the buffer circuit 31b does not indicate a match in the identified voltage section even when the comparative voltage RAMP is swept. Therefore, the result of the comparison CMPOUT does not invert.

Figure 15B:
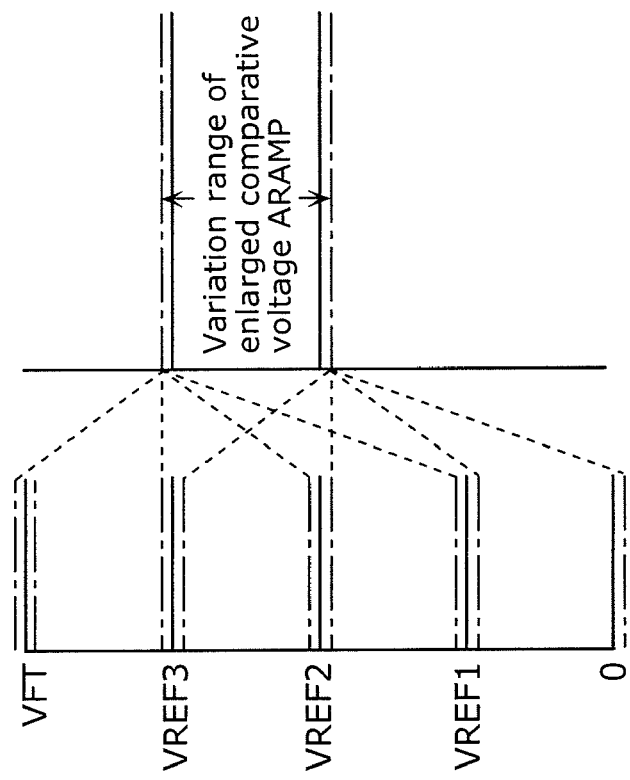
FIG. 15B is a diagram which illustrates a variation range of an enlarged comparative voltage.
Figure 15A:
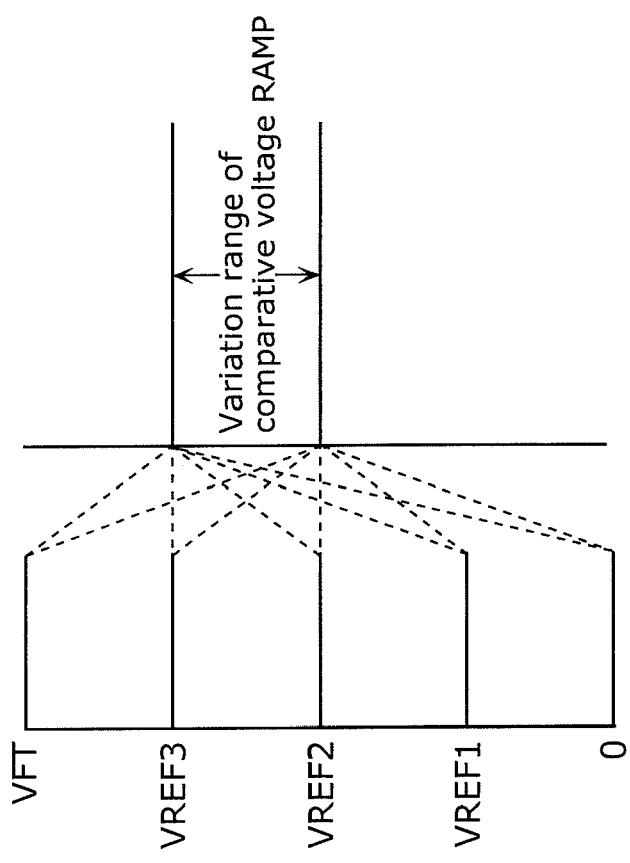
FIG. 15A is a diagram which illustrates a situation where conversion of a least significant bit is possibly to fail.

FIG. 15A is a diagram which explains a possible situation where such a problem may occur. Since the comparative voltage RAMP varies in the range between the reference voltages adjacent to each other, in the case where the signal voltage VREF varies over the reference voltage to an adjacent voltage section, no match can be seen in the identified voltage section.

Accordingly, it is considered to use an enlarged comparative voltage ARAMP having an enlarged variation range of the comparative voltage RAMP.

FIG. 15B is a diagram which explains the variation range of the enlarged comparative voltage ARAMP.

The enlarged comparative voltage ARAMP is generated so as to vary in a range that includes a predetermined margin added to the range between the reference voltages adjacent to each other, by changing at least one of an upper limit voltage and a lower limit voltage of a voltage generated in DAC52 of the comparative signal generation unit 50, for example.

FIG. 15B typically illustrates that the enlarged comparative voltage ARAMP is generated so as to vary between a voltage lower than the minimum voltage of the comparative voltage RAMP to a voltage higher than the peak in the voltage of the comparative voltage RAMP.

The comparison operation for converting the least significant bit is carried out redundantly near the reference voltage by using the enlarged comparative voltage ARAMP instead of the comparative voltage RAMP, so that there can always be seen a match even when the signal voltage VREF varies over the reference voltage, making it possible to prevent a fail in a conversion of the least significant bit.

A Second Embodiment

Next, a solid-state imaging device according to a second embodiment will be described.

The solid-state imaging device according to the second embodiment is different from the solid-state imaging device 1 according to the first embodiment, in that an analogue signal to be processed has a polar character that is different from each other. More specifically, a negative signal voltage (the more light received, the lower the voltage becomes) is converted to a digital signal in the first embodiment, whereas a positive signal voltage (the more light received, the higher the voltage becomes) is converted to a digital signal in the second embodiment.

A functional structure of the solid-state imaging device according to the second embodiment is the same with the functional structure of the solid-state imaging device 1 as illustrated in FIG. 1 and FIG. 2.

Figure 16:
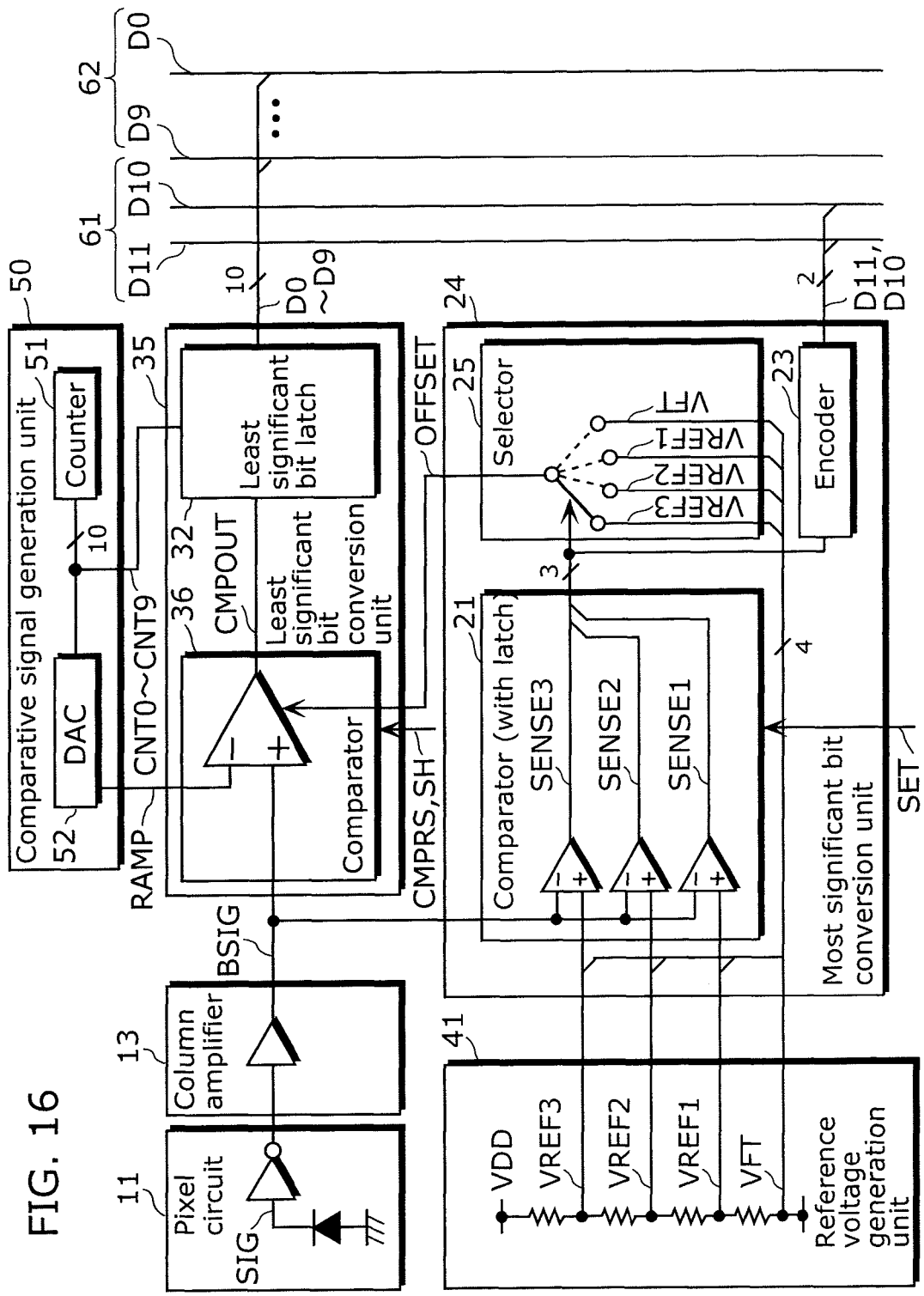
FIG. 16 is a block diagram which illustrates an example of a structure of a portion corresponding to a column of an AD conversion unit in accordance with a second embodiment.

FIG. 16 is a block diagram which illustrates a portion for converting an analogue signal obtained from a single pixel into a digital signal in the solid-state imaging device according to the second embodiment. The portion illustrated in FIG. 16 can be replaced with the portion of the solid-state imaging device 1 as illustrated in FIG. 4.

Hereinafter, for the same elements as in the solid-state imaging device 1, the same numerals are applied for the sake of simplification, and descriptions will be given centering on the points different from the solid-state imaging device 1.

Hereinafter, for the same elements as in the solid-state imaging device 1, the same numerals are applied for the sake of simplification, and descriptions will be given centering on the points different from the solid-state imaging device 1. In the second embodiment a noninverting amplifier is used for a column amplifier 13. A signal voltage BSIG outputted from the column amplifier 13 has a positive polar character.

Hereinafter, for the same elements as in the solid-state imaging device 1, the same numerals are applied for the sake of simplification, and descriptions will be given centering on the points different from the solid-state imaging device 1. It is assumed that the signal voltage BSIG can assume a voltage range, for example, which ranges from a peak in the voltage VDD when receiving the maximum amount of light to a minimum voltage (feed-through level) VFT when receiving no light.

A reference voltage generation unit 41 divides VDD and VFT which are voltages at the ends of the voltage range, so that mutually different reference voltages VREF1 to VREF3 and VFT are generated within the voltage range. The voltage range that the signal voltage BSIG can assume is divided into four voltage sections, each of which has a corresponding one of the reference voltages VREF1 to VREF3 and VFT as a lower limit voltage. In this case, the lower limit voltage is the base point of respective voltage sections.

In a most significant bit conversion unit 24, a comparator 21 compares the signal voltage BSIG in parallel with each of the reference voltages VREF1 to VREF3 simultaneously, and latches results of the comparison SENSE1 to SENSE3.

An encoder 23 encodes most significant bits D10 and D11 using the results of the comparison SENSE1 to SENSE3.

The selector 25 selects a base point of the voltage section that includes the signal voltage BSIG from among reference voltages VREF1 to VREF3 and VFT, using the results of the comparison SENSE1 to SENSE3, and provides a least significant bit conversion unit 35 with the selected base point as an offset voltage OFFSET.

Figure 17:
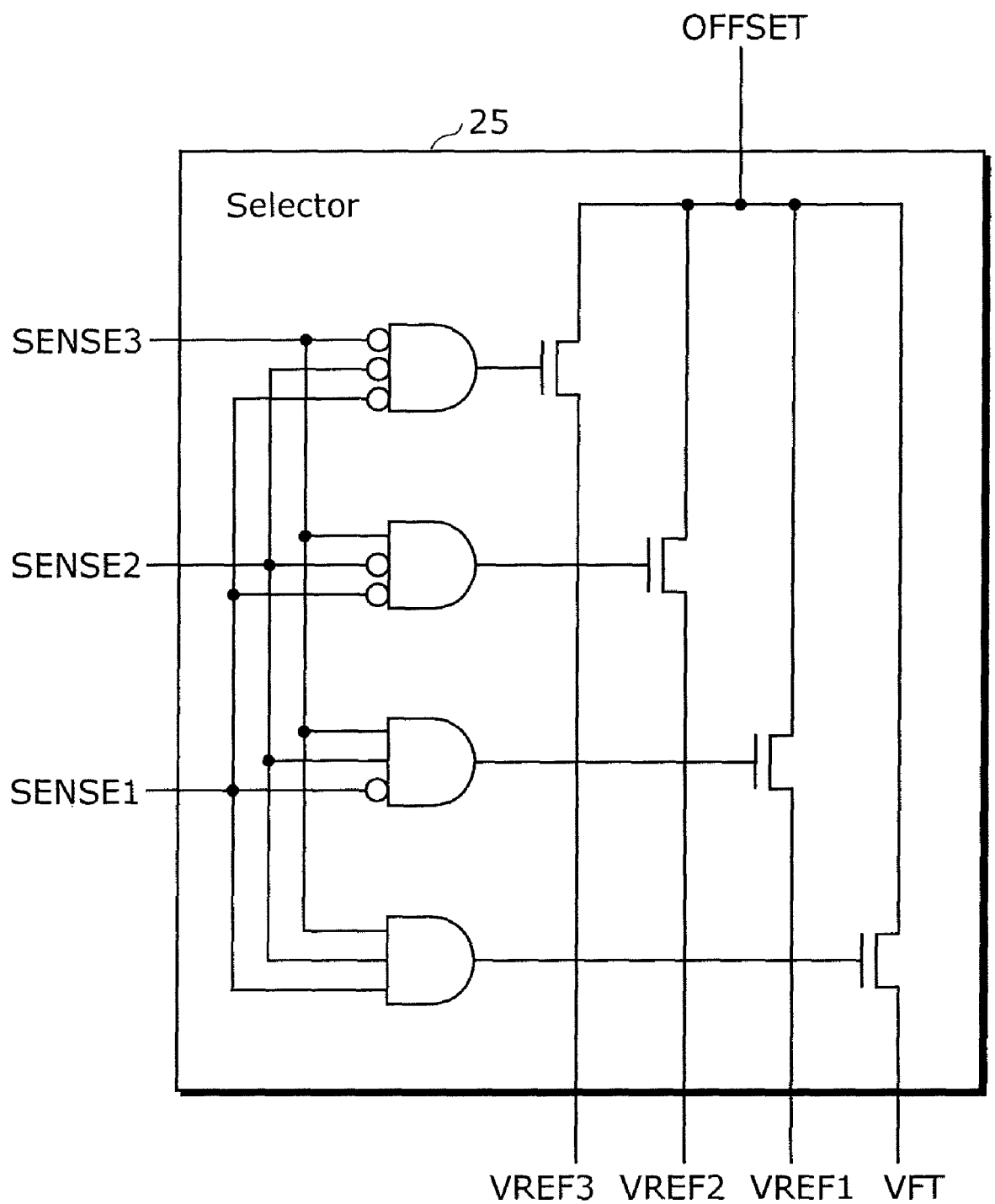
FIG. 17 is a circuit diagram which illustrates an example of a detailed structure of a selector.

FIG. 17 is a circuit diagram which illustrates an example of a detailed structure of the selector 25. The selector 25 includes the same circuit as the selector 22 as illustrated in FIG. 7, but has a different reference voltage to be connected to an input.

In the least significant bit conversion unit 35, the comparator 31 compares a difference voltage between the signal voltage BSIG outputted from the column amplifier 13 and the offset voltage OFFSET outputted from the selector 25 with the comparative voltage RAMP outputted from the DAC52.

Figure 18:
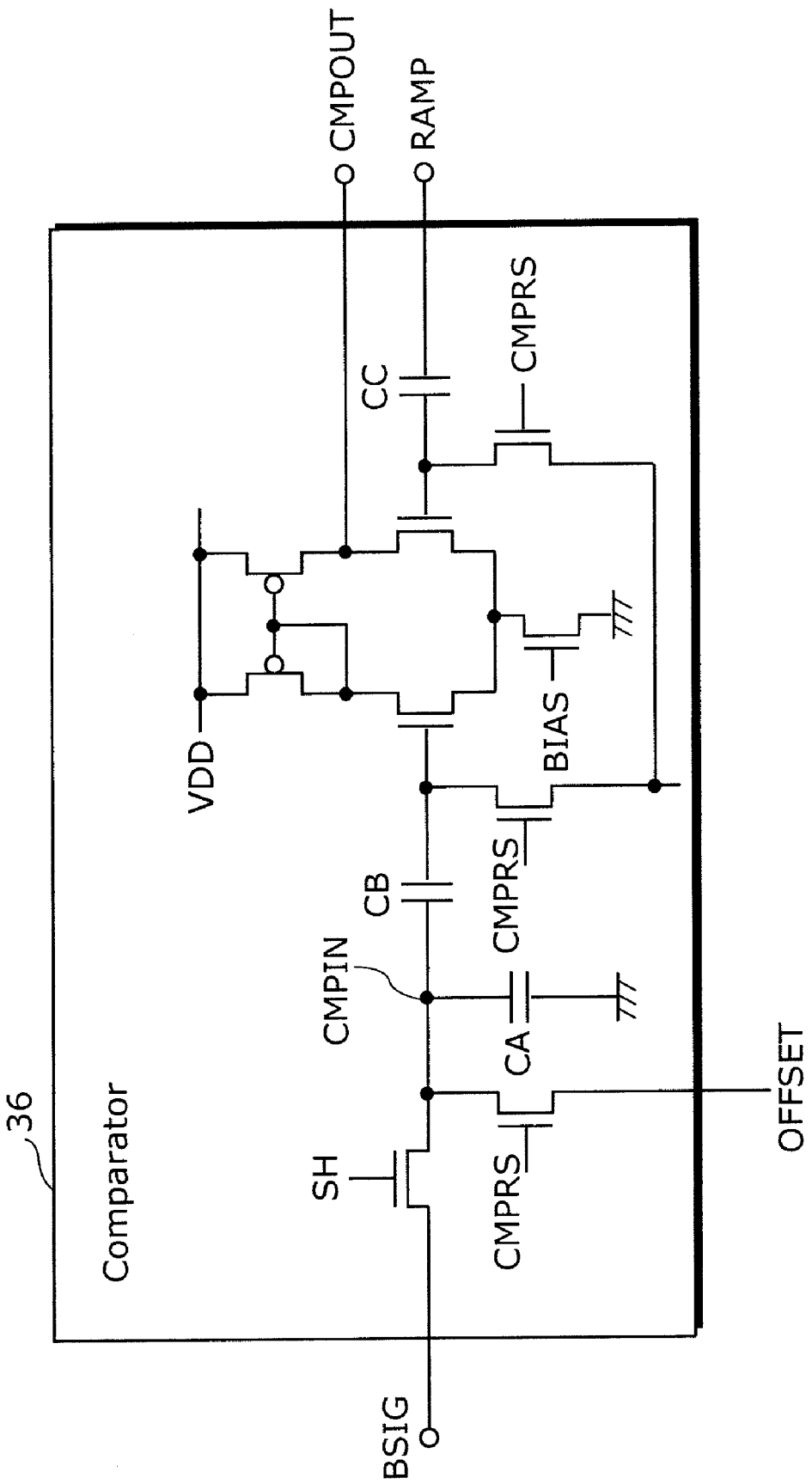
FIG. 18 is a circuit diagram which illustrates an example of a detailed structure of a comparator.

FIG. 18 is a circuit diagram which illustrates an example of a detailed structure of the comparator 36.

In the comparator 36 as illustrated in FIG. 18, a composite voltage CMPIN is obtained by composing the offset voltage OFFSET and the signal voltage BSIG, at a connecting point of two capacitors CA and CB which are connected in series.

Here, by setting the capacity of the capacitors CA, CB, and CC as CB=CC and CB>>CA, a difference voltage Δv between the offset voltage OFFSET and the signal voltage BSIG arises as the varied amount of the composite voltage CMPIN.

The difference voltage Δv is compared with the increasing comparative voltage RAMP, and the output signal CMPOUT is inverted when the comparative voltage RAMP reaches the difference voltage Δv.

Figure 19:
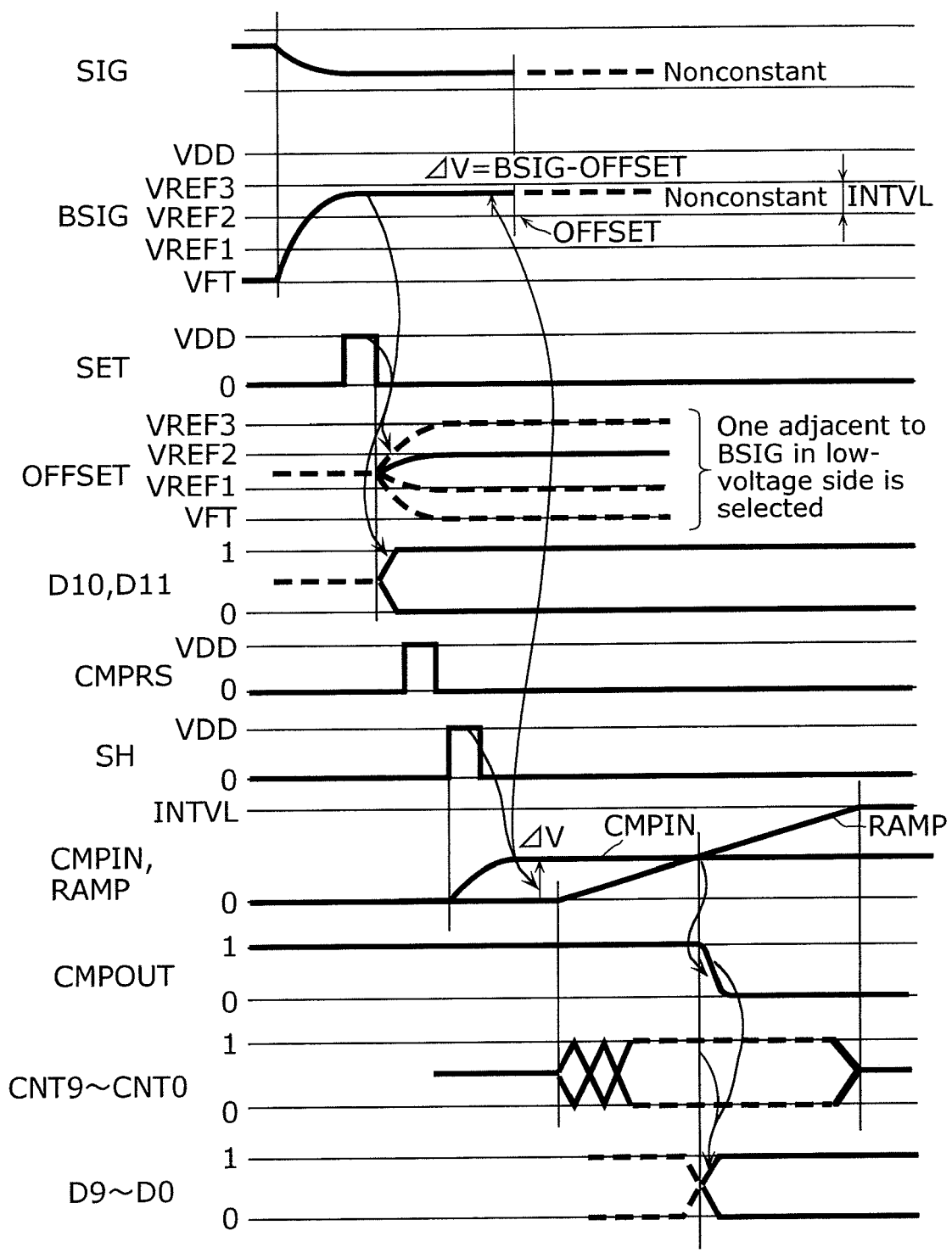
FIG. 19 is a timing diagram which illustrates an example of an operation of a most-significant-bit conversion unit and a least-significant-bit conversion unit.

FIG. 19 is a timing diagram which illustrates an example of the operation of the most significant bit conversion unit 24 and the least significant bit conversion unit 35.

An electric signal SIG obtained in the pixel circuit 11 is amplified to a signal voltage BSIG by the column amplifier 13 and is determined to be the voltage as Δv higher than the reference voltage VREF2 and in between the reference voltage VREF2 and VREF3. Here, the width of the space between the reference voltages adjacent to each other is indicated as INTVL.

The timing control unit 80 outputs a control signal SET at a predetermined timing when the signal voltage BSIG is determined. With this, the comparator 21 compares the signal voltage BSIG and the reference voltages VREF1 to VREF3, and results of the comparison SENSE1 to SENSE3 are latched to either "0" or "1".

Then, according to the latched results of the comparison SENSE1 to SENSE3, the selector 22 selects, as the offset voltage OFFSET, a base point of the voltage section that includes the signal voltage ASIG (here, the one adjacent to the signal voltage BSIG in the low-voltage side) from among the reference voltages VREF1 to VREF3 and VFT, and the encoder 23 determines a value of the most significant bits D11 and D10.

Subsequently, when the control signals CMPRS and SH are provided from the timing control unit 80, the composite voltage CMPIN becomes Δv. Then, the count values CNT0 to CNT9 are updated according to the clock CK outputted from the timing control unit 80, and the comparative voltage RAMP increases.

Then, the output signal CMPOUT is inverted when the comparative voltage RAMP reaches the composite voltage CMPIN, and the count values CNT0 to CNT9 at that time are latched as the least significant bits D0 to D9.

As described above, the solid-state imaging device according to the second embodiment also converts the least significant bit within the voltage section which is narrowed by converting the most significant bit just as the solid-state imaging device according to the first embodiment, making it possible to obtain the advantage of shortening the time for converting the least significant bit.

It is to be noted that, by combining the solid-state imaging device according to the second embodiment with the aforementioned technique of decreasing the clock frequency used for converting the least significant bit, it is possible to improve a trade-off between the conversion time for the least significant bit and conversion accuracy and power consumption.

Further, it is possible to prevent a fail in converting the least significant bit by combining the solid-state imaging device according to the second embodiment with the aforementioned technique of carrying out redundantly the comparison operation for converting the least significant bit near the reference voltage.

A Third Embodiment

Next, a solid-state imaging device according to a third embodiment will be described.

The solid-state imaging device according to the third embodiment is different from the solid-state imaging device 1 according to the first embodiment, in that voltage comparison for converting the least significant bit is carried out in parallel with plural voltage sections.

Figure 20:
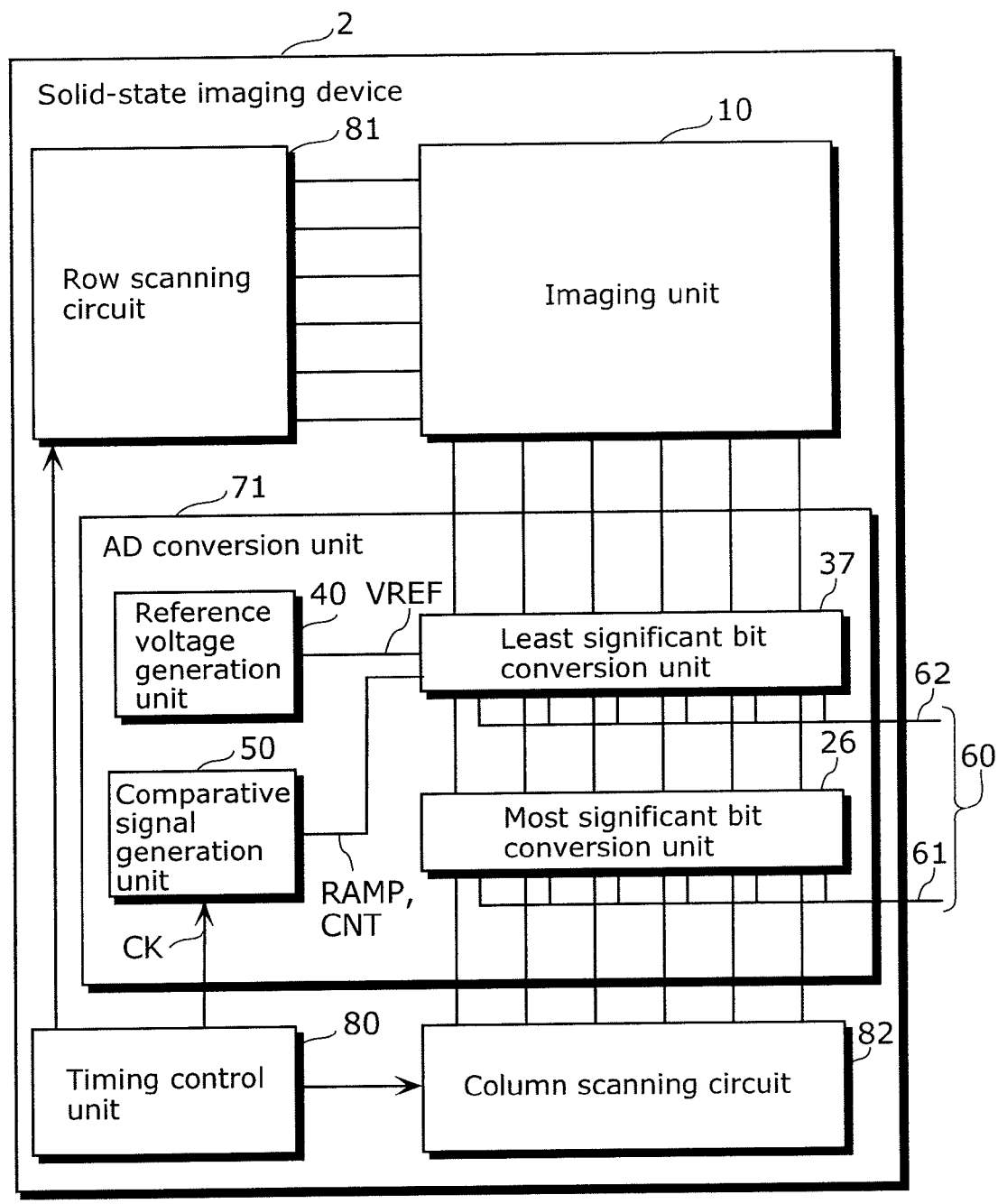
FIG. 20 is a block diagram which illustrates an example of a schematic structure of a solid-state imaging device in accordance with a third embodiment.

FIG. 20 is a block diagram which illustrates an example of a schematic structure of a solid-state imaging device 2 according to the third embodiment.

As illustrated in FIG. 20, the solid-state imaging device 2 includes a least significant bit conversion unit 37 and a most significant bit conversion unit 26 which are altered compared to respective corresponding units of the solid-state imaging device 1 (see FIG. 1). Each of the units will be described later in detail with reference to FIG. 21. Hereinafter, for the same structure as the solid-state imaging device 1, the same numerals are applied and descriptions are abbreviated where appropriate, and the description will be given centering on the points different from the solid-state imaging device 1.

It is to be noted that, FIG. 20 may be regarded as illustrating an arrangement of circuit blocks on a semiconductor substrate, that is, a floor layout, when the solid-state imaging device 2 is embodied as a semiconductor integrated circuit device, each of the circuit blocks corresponding to one of the units.

Figure 21:
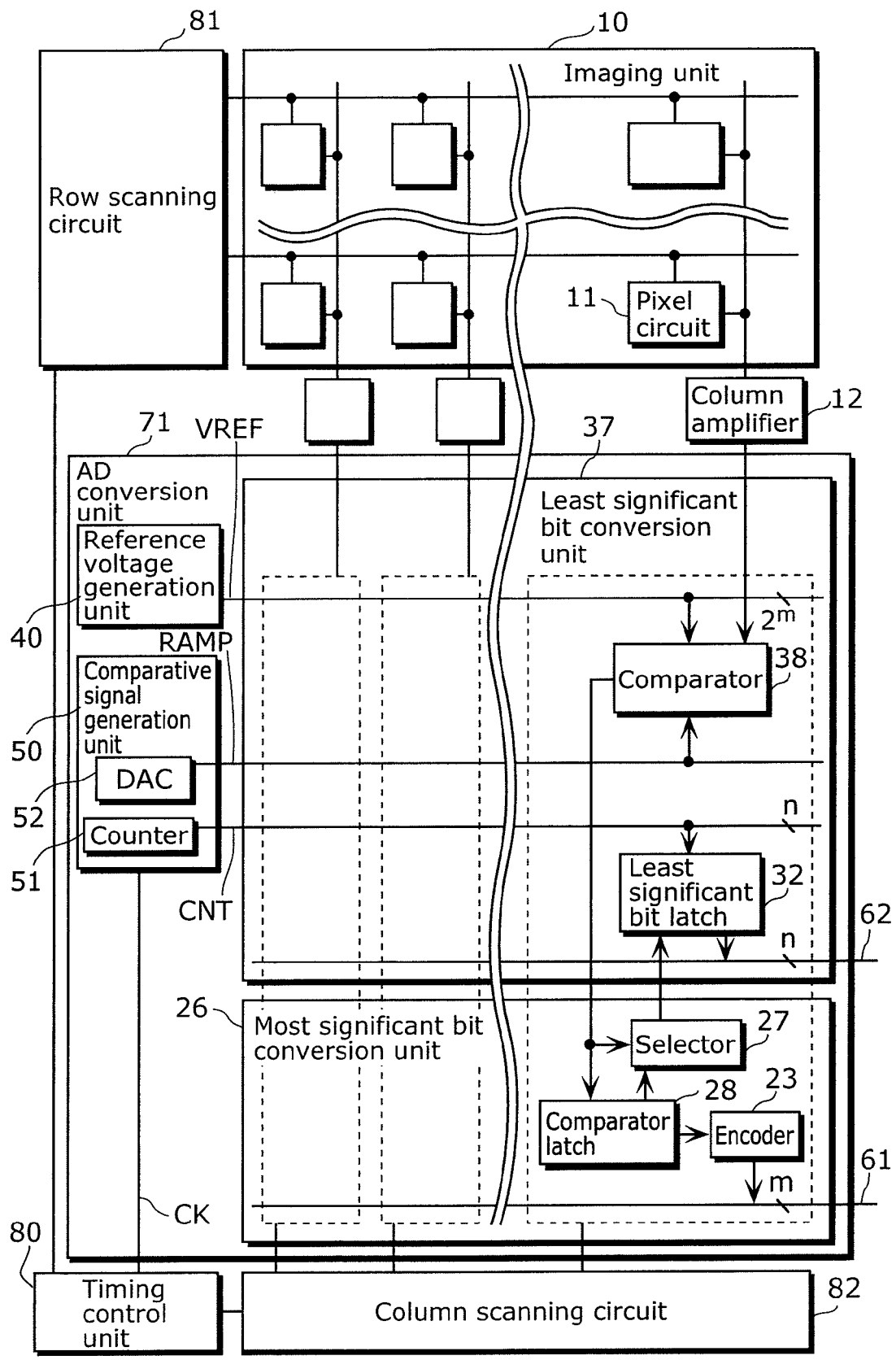
FIG. 21 is a block diagram which illustrates an example of a functional structure of an AD conversion unit.

FIG. 21 is a block diagram which illustrates an example of a functional structure of the solid-state imaging device 2.

The least significant bit conversion unit 37 includes a comparator 38 and a least significant bit latch 32, the comparator 38 comparing plural difference voltages between a signal voltage and respective reference voltages in parallel with a comparative voltage and outputting respective results of the comparison to the most significant bit conversion unit 26.

The most significant bit conversion unit 26 includes: a comparison result latch 28; a selector 27; and an encoder 23. The comparison result latch 28 latches a result of the comparison at the time of starting the comparison operation carried out by the comparator 38. The selector 27 selects one of the latest latched results of the comparison and outputs the selected result to the least significant bit latch 32. The encoder 12 encodes the latched comparison result to the most significant bit and outputs to the most significant bit bus 61.

It is to be noted that, in the least significant bit conversion unit 37 and the most significant bit conversion unit 26 in FIG. 21, since the columns enclosed in broken lines are the same in the structure, only the right most column is illustrated with the structure.

Figure 22:
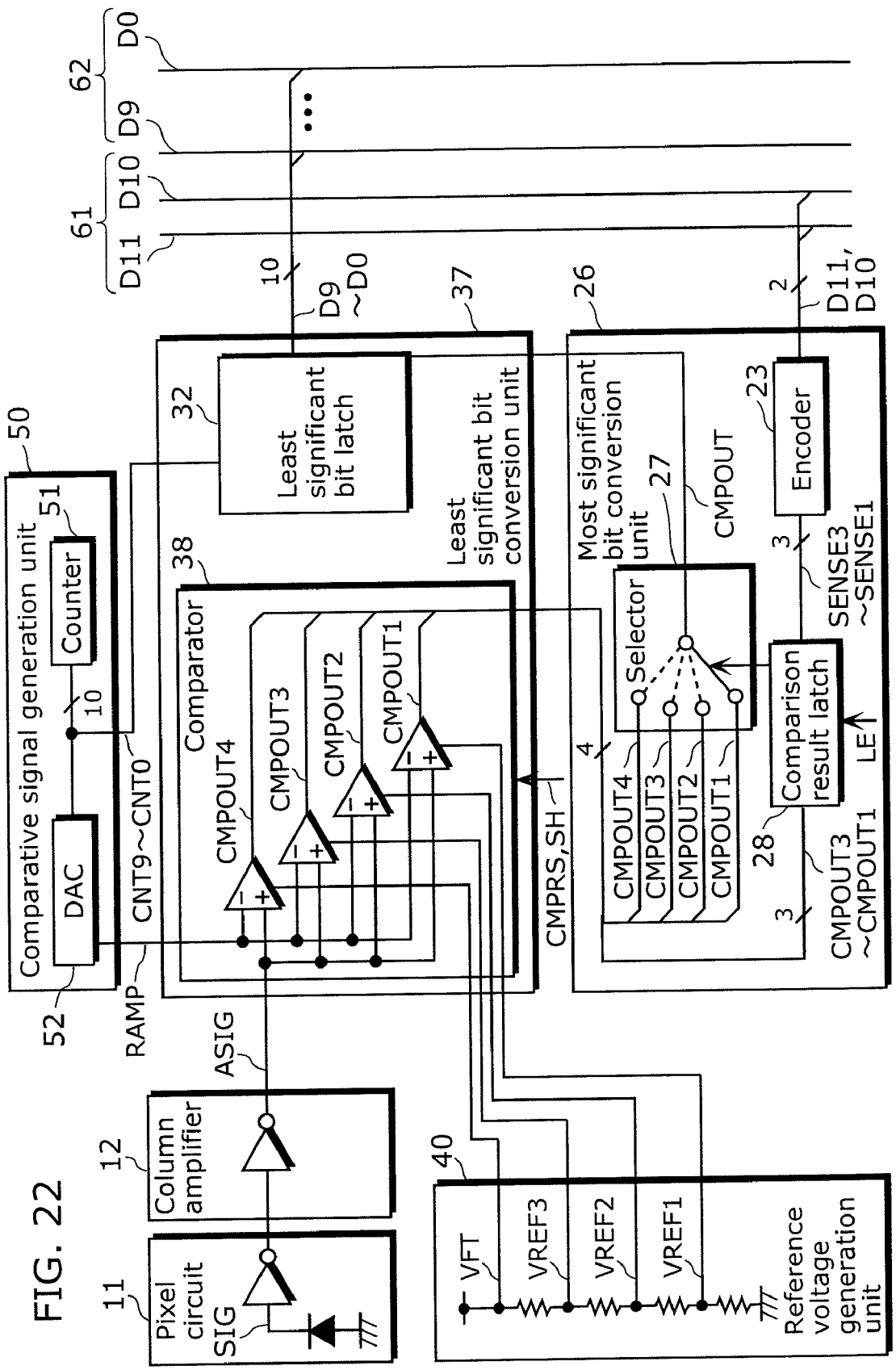
FIG. 22 is a circuit diagram which illustrates an example of a structure of a portion corresponding to a column of the AD conversion unit.

FIG. 22 is a block diagram which illustrates a portion for converting an analogue signal obtained from a single pixel to a digital signal in the solid-state imaging device 2. As to the most significant bit conversion unit 26 and the least significant bit conversion unit 37, only the portion corresponding to a single column (one of the portions enclosed in broken lines in FIG. 21) is illustrated. It is also to be noted that some parts are illustrated with circuit symbols which typically represent internal functions.

As to the voltage range that the signal voltage ASIG can assume, the reference voltages VREF1 to VREF3 and VFT each of which is generated by the reference voltage generation unit 40, and the signal voltage ASIG having a negative polar character, the same descriptions as in the first embodiment can be applied.

In the least significant bit conversion unit 37, the comparator 38 includes four separate comparators each corresponding to one of the four reference voltages. For the separate comparators, one of the comparator 31 (see FIG. 9), the comparator 33 (see FIG. 10), and the comparator 34 (FIG. 13) is used, for example.

Each of the separate comparators is associated with a corresponding one of the reference voltages VREF1 to VREF3 and VFT, provided with a corresponding one of the reference voltages as an offset voltage, and compares the difference voltage between the offset voltage and the signal voltage ASIG with a commonly utilized comparative voltage RAMP. The results of the comparison obtained from the separate comparators each corresponding to one of the reference voltages VREF1 to VREF3 and VFT are indicated as CMPOUT1 to CMPOUT4, respectively.

In the most significant bit conversion unit 26, the comparison result latch 28 latches results of the comparison CMPOUT1 to CMPOUT 3, as SENSE1 to SENSE3, at the time of starting the comparison operation carried out by the comparator 38, the selector 27 selects one of the latest results of the comparison CMPOUT1 to CMPOUT 4 according to the latched results of the comparison CMPOUT1 to CMPOUT 3 and outputs the selected result of the comparison to the least significant bit latch 32.

It is to be noted that the results of the comparison CMPOUT1 to CMPOUT 3 at the time of starting the comparison operation is the results of comparing the comparative voltage RAMP that is assumed to be 0 with the signal voltage ASIG and the reference voltages VREF1 to VREF3, respectively, and therefore is synonymous with the results of the comparison SENSE1 to SENSE3 carried out by the comparator 21 of the first embodiment.

Figure 23:
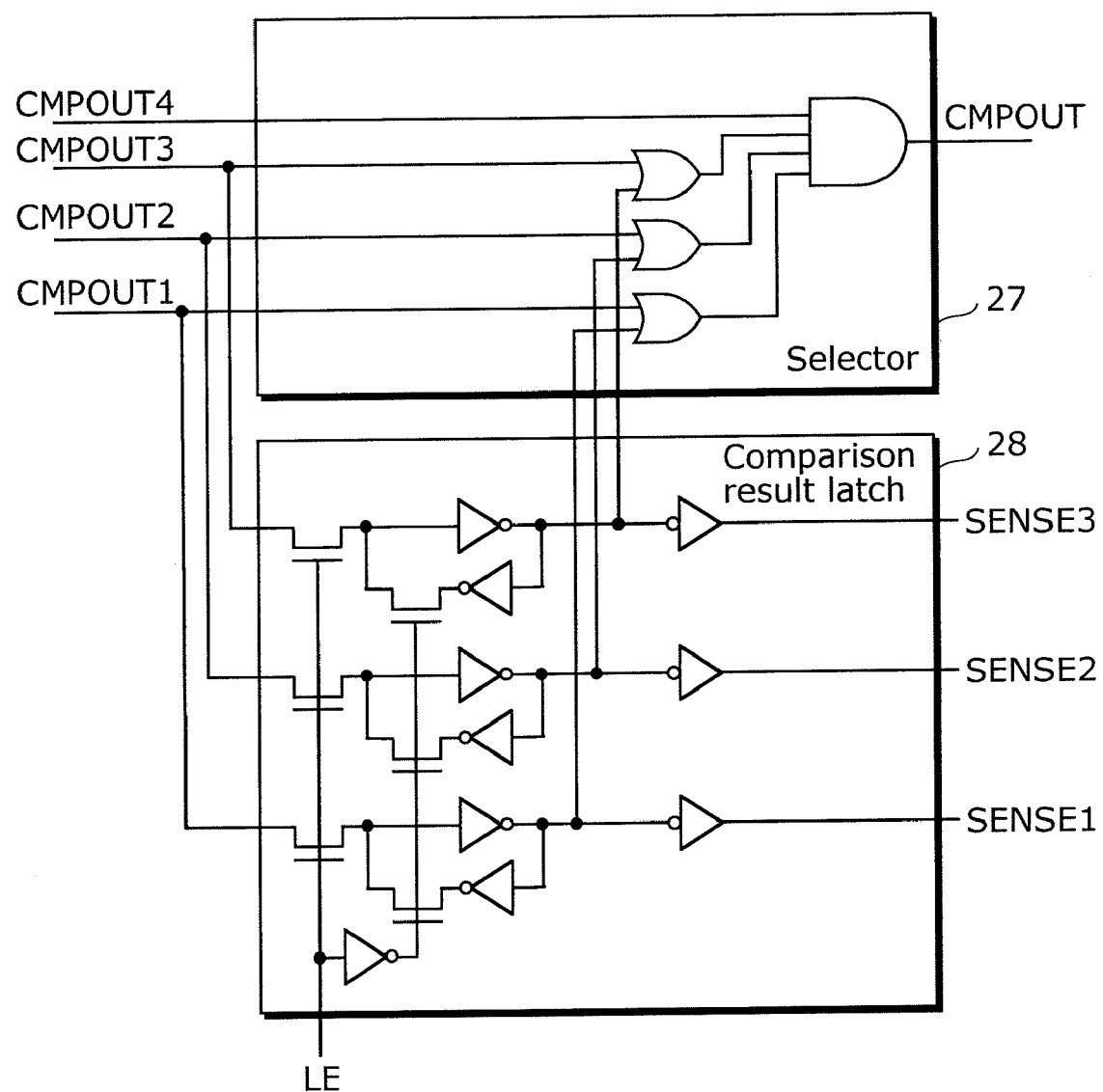
FIG. 23 is a circuit diagram which illustrates an example of a detailed structure of a comparison result latch and a selector.

FIG. 23 is a circuit diagram which illustrates an example of a detailed structure of the selector 27 and the comparison result latch 28.

The comparison result latch 28 latches the results of the comparison CMPOUT1 to CMPOUT2 according to a control signal LE provide by the timing control unit 80 at the time of starting the comparison operation, in other words, immediately before the comparative voltage RAMP starts increasing, and outputs the latched results as the results of the comparison SENSE1 to SENSE3.

A result of the comparison CMPOUTi which is higher than the reference voltage corresponding to the signal voltage ASIG, among results of the comparison each corresponding to one of the reference voltages VREF1 to VREF3 and VFT, is inverted to "0" from the beginning.

The selector 27 masks, according to the results of comparison SENSE1 to SENSE3, the result of the comparison CMPOUTi which is inverted from the beginning to "1" in an OR gate. The comparison CMPOUTj corresponding to the lowest reference voltage among results of the comparison j which are not masked will be inverted from "1" to "0" while the comparative voltage RAMP increases, and the rest of the results of the comparison CMPOUTj will not be inverted to the end.

The selector 27, therefore, uses a simple circuit that outputs a value of AND operation of all of the results of the comparison CMPOUTj that are not masked to select the result of the comparison CMPOUTj that is possible to invert.

It is to be noted that masking may be performed to all of the results of the comparison CMPOUTi other than the result of the comparison CMPOUTj that corresponds to the lowest reference voltage among the results of the comparison that are not inverted at the beginning, by completely decoding the results of the comparison SENSE1 to SENSE3.

Figure 24:
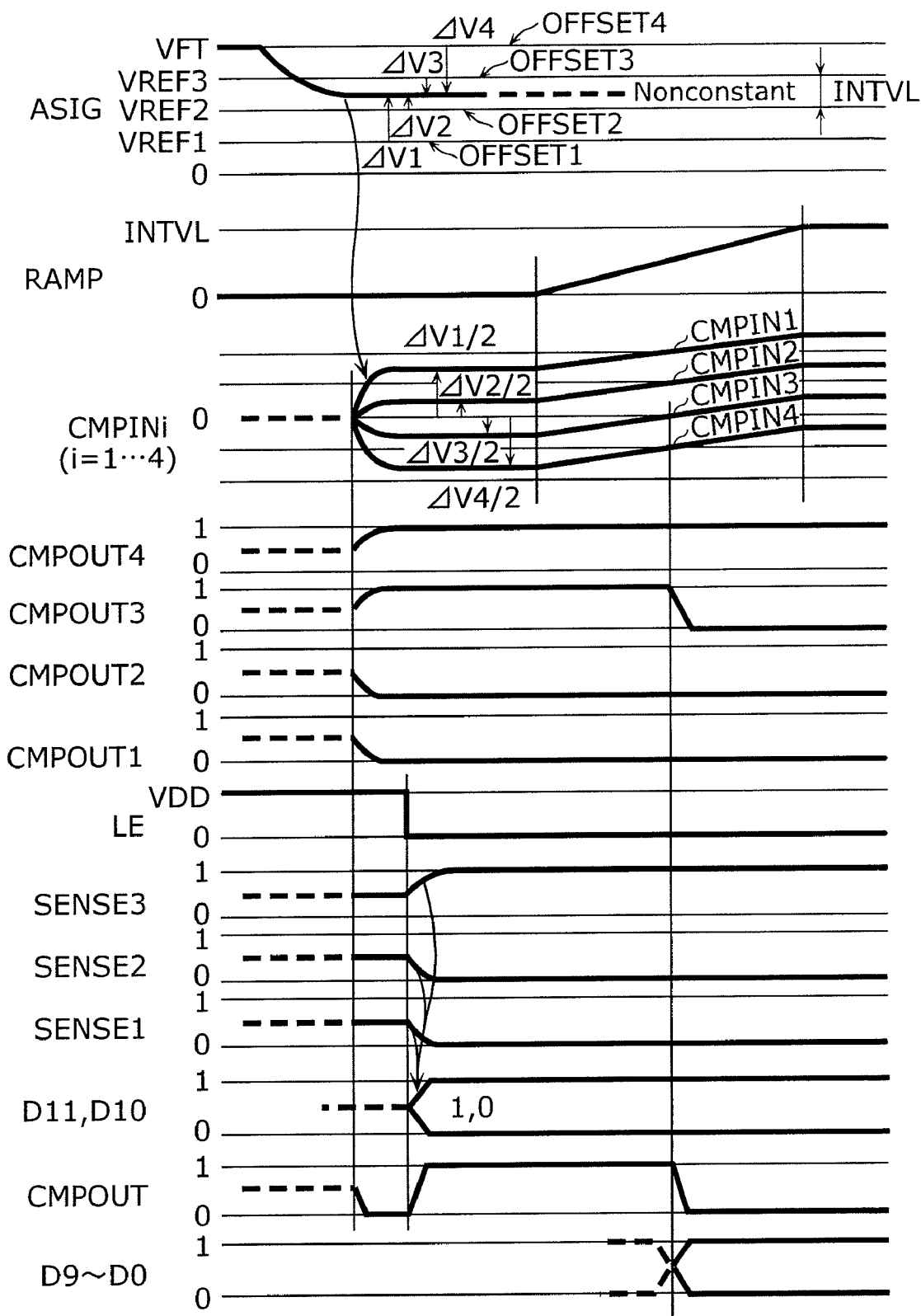
FIG. 24 is a timing diagram which illustrates an example of an operation of a most-significant-bit conversion unit and a least-significant-bit conversion unit.
Figure 25:
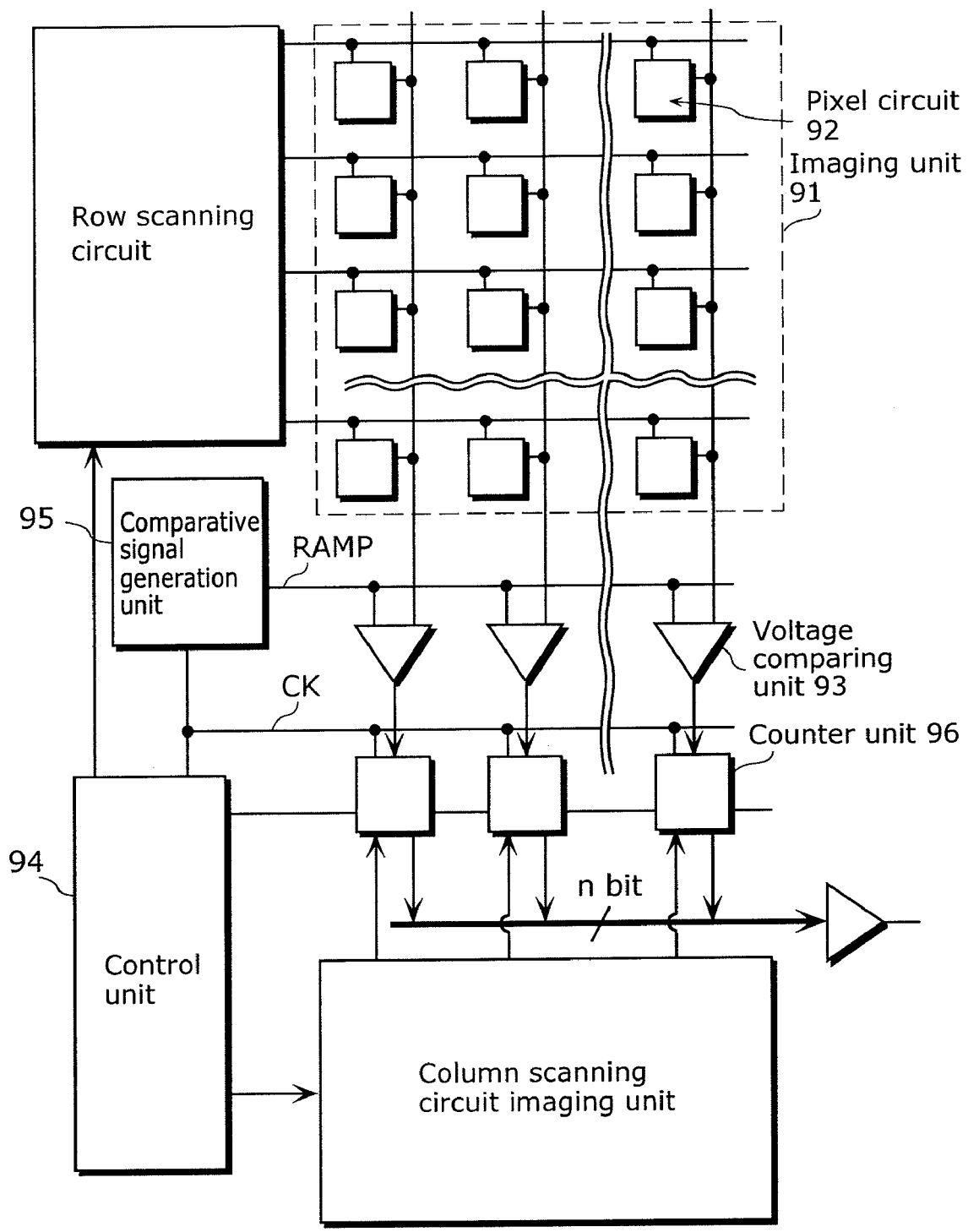
FIG. 25 is a block diagram which illustrates an example of a functional structure of a conventional solid-state imaging device.

FIG. 24 is a timing diagram which illustrates an example of the operation of the most significant bit conversion unit 26 and the least significant bit conversion unit 37.

The timing diagram indicates, as an example, the operation of the most significant bit conversion unit 26 and the least significant bit conversion unit 37 which have been described above.

The signal voltage ASIG is determined to be a value between the reference voltages VREF 2 and VREF3. Here, the width of the space between the reference voltages adjacent to each other is indicated as INTVL.

A composite voltage CMPINi (I=1 ... 4) is determined, for the signal voltage ASIG of which the value has been determined, in each of the four separate comparators in the comparator 38. Each of the composite voltages CMPINi is half the corresponding one of the difference voltages $\Delta v1$ to $\Delta 4$ between the signal voltage ASIG and a corresponding one of the reference voltages VREF1 to VREF3 and VFT.

The results of the comparison CMPOUT1 and CMPOUT2 become "0", each corresponding to one of the composite voltages CMPIN1 and CMPIN2 each having a value equal to or more than 0, and the results of the comparison CMPOUT3 and CMPOUT4 become "1", each corresponding to one of the composite voltages CMPIN3 and CMPIN4 each having a value less than 0.

The result of the comparison SENSE1 to SENSE3 is latched to a value of CMPOUT1 to CMPOUT3 at the time when the control signal LE from the timing control unit 80 becomes "0", and a value for the most significant bits D11 and the D11 is determined.

The results of the comparison CMPOUT1 and CMPOUT2 are masked to "1" respectively corresponding to the results of the comparison SENSE1 and SENSE2 which are latched to "0", and the value of AND operation of the results of the comparison CMPOUT3 and CMPOUT4 is outputted to the result of the comparison CMPOUT. As a result, the result of the comparison CMPOUT that once indicated "0" becomes "1".

Then, when the comparative voltage RAMP increases according to the clock CK outputted from the timing control unit 80, each of the composite voltages CMPINi increases by half the increasing amount of the comparative voltage RAMP.

Subsequently, the result of the comparison CMPOUT3 becomes "0" when the composite voltage CMPIN3 returns to the initial voltage 0, and this makes the result of the comparison CMPOT "0" which is the value of AND operation of the results of the comparison CMPOT3 and CMPOT4, so that the value of the least significant bits D0 to D9 is fixed.

As described above, the solid-state imaging device 2 according to the third embodiment can convert the least significant bit by comparing the comparative voltage in parallel with plural difference voltages between the signal voltage and a corresponding one of the reference voltages, and fixing the count value at time when one of the plural results of the comparison is inverted.

Further, although in the description for the solid-state imaging device 2 according to the third embodiment, the value of the most significant bit is determined using the plural results of the comparison CMPOYTi that are the results immediately before the comparative voltage RAMP starts increasing, it is not essential that the most significant bit is determined immediately before the comparative voltage RAMP starts increasing.

For example, the value of the most significant bit may be determined by identifying to which reference voltages VREF1 to VREF3 and VFT the inverted result of the comparison CMPOUTi corresponds. It is possible to identify which result of the comparison inverted, by using separate latches triggered at the edge of each of the results of the comparison CMPOUTi, for example. In this case, the value of the least significant bit may be fixed by driving an edge-triggered latch with the comparison result signal CMPOUT represented as the valued of exclusive OR of all of the results of the comparison CMPOUTi in place of the comparison result signal CMPOUT generated by masking the result of the comparison CMPOUT i that is inverted from the beginning.

It is to be noted that, by combining the solid-state imaging device 2 according to the third embodiment with the aforementioned technique of decreasing the clock frequency used for converting the least significant bit, it is possible to improve a trade-off between the conversion time for the least significant bit and conversion accuracy and power consumption.

Further, it is possible to prevent a fail in converting the least significant bit by combining the solid-state imaging device 2 according to the third embodiment with the aforementioned technique of carrying out redundantly the comparison operation for converting the least significant bit near the reference voltage.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The solid-state imaging device according to the present invention can be widely applied to solid-state imaging devices that output a signal voltage obtained through photoelectric conversion as a digital signal, and can be applied to a great variety of products such as a digital still camera, a digital video camera, a camera for a mobile terminal, an on-vehicle camera, a street camera, a security camera, a camera for medical use, and so on.

What is claimed is:

1. A solid-state imaging device, comprising:
a plurality of pixel circuits arranged in a matrix, each of which performs photoelectric conversion on a received light; and
an AD conversion unit configured to convert a signal voltage into a digital signal represented as a plurality of bits, the signal voltage being a resultant of the photoelectric conversion,
wherein said AD conversion unit includes:
a reference voltage generation unit configured to generate a plurality of reference voltages within a possible range for the signal voltage, each of the reference voltages being different from each other;
a most significant bit conversion unit configured to identify, from among a plurality of voltage sections, a voltage section that includes the signal voltage, and to determine a result of the identification as a value of a most significant bit of the digital signal, each of the voltage sections having a corresponding one of the reference voltages as a base point; and
a least significant bit conversion unit configured to convert a difference voltage into a least significant bit of the digital signal, the difference voltage indicating a difference between the signal voltage and the reference voltage that is the base point of the identified voltage section.

2. The solid-state imaging device according to claim 1, wherein said AD conversion unit further includes a comparative signal generation unit configured to generate a comparative voltage that varies in a range between the reference voltages adjacent to each other and a count value that is updated as the comparative voltage varies,
said most significant bit conversion unit is configured to identify a voltage section that includes the signal voltage by comparing the signal voltage in parallel with each of the reference voltages, and to output, as an offset voltage, the reference voltage that is the base point of the identified voltage section to said least significant bit conversion unit, and
said least significant bit conversion unit is configured to compare a difference voltage between the signal voltage and the offset voltage with the comparative voltage that varies, and to determine, as a least significant bit of the digital signal, the count value at a time when a result of the comparison is inverted.

3. The solid-state imaging device according to claim 2, wherein said comparative signal generation unit is configured to generate an enlarged comparative voltage that varies in a range that includes a predetermined margin added to the range between the reference voltages adjacent to each other, and
said least significant bit conversion unit is configured to obtain the least significant bit of the digital signal by comparing the difference voltage with the enlarged comparative voltage that varies.

4. The solid-state imaging device according to claim 2, wherein said least significant bit conversion unit includes:
a voltage composition circuit which generates a composite voltage by deducting the signal voltage from, and adding the comparative voltage to, the offset voltage, and outputs the generated composite voltage; and
a buffer circuit which includes a plurality of inverters connected in series, said buffer circuit being applied with the composite voltage, and
said least significant bit conversion unit is configured to determine, as the least significant bit of the digital signal, the count value at a time when an output of said buffer circuit is inverted.

5. The solid-state imaging device according to claim 4, wherein each of said inverters is an NMOS transistor, and
said least significant bit conversion unit further includes a power down circuit which connects an input of each of said inverters to a fixed voltage subsequent to an invert of the output from said buffer circuit.

6. The solid-state imaging device according to claim 4, wherein said least significant bit conversion unit further includes an amplifying circuit which amplifies the composite voltage, and said buffer circuit is applied with the amplified composite voltage.

7. The solid-state imaging device according to claim 2,
Wherein said least significant bit conversion unit further includes:
a voltage composition circuit which generates a composite voltage by deducting the offset voltage from the signal voltage and outputs the generated composite voltage; and
a comparison circuit which compares the composite voltage with the comparative voltage, and
said least significant bit conversion unit is configured to determine, as the least significant bit of the digital signal, the count value at a time when an output signal of said comparison circuit is inverted.

8. The solid-state imaging device according to claim 1,
wherein said AD conversion unit further includes a comparative signal generation unit configured to generate a comparative voltage that varies in a range between the reference voltages adjacent to each other and a count value that is updated as the comparative voltage varies,
said least significant bit conversion unit is configured to compare a plurality of difference voltages between the signal voltage and each of the reference voltages in parallel with the comparative voltage that varies, and to determine, as the least significant bit of the digital signal, the count value at a time when one of results of the comparison is inverted, and
said most significant bit conversion unit is configured to identify a voltage section that includes the signal voltage by using the result of the comparison at a time when said least significant bit conversion unit starts the comparison operation.

9. The solid-state imaging device according to claim 8,
wherein said comparative signal generation unit is configured to generate an enlarged comparative voltage that varies in a range that includes a predetermined margin added to the range between the reference voltages adjacent to each other, and
said least significant bit conversion unit is configured to obtain the least significant bit of the digital signal by comparing the difference voltage with the enlarged comparative voltage that varies.

10. A semiconductor integrated circuit, comprising:
a plurality of pixel circuits arranged in a matrix, each of which performs photoelectric conversion on a received light; and
an AD conversion unit configured to convert a signal voltage into a digital signal represented as a plurality of bits, the signal voltage being a resultant of the photoelectric conversion,
wherein said AD conversion unit includes:
a reference voltage generation unit configured to generate a plurality of reference voltages within a possible range for the signal voltage, each of the reference voltages being different from each other;
a most significant bit conversion unit configured to identify, from among a plurality of voltage sections, a voltage section that includes the signal voltage, and to determine a result of the identification as a value of a most significant bit of the digital signal, each of the voltage sections having a corresponding one of the reference voltages as a base point; and
a least significant bit conversion unit configured to convert a difference voltage into a least significant bit of the digital signal, the difference voltage indicating a difference between the signal voltage and the reference voltage that is the base point of the identified voltage section.

11. A signal processing method used in a solid-state imaging device, said method comprising:
performing photoelectric conversion on a received light; and
converting a signal voltage into a digital signal represented as a plurality of bits, the signal voltage being a resultant of the photoelectric conversion,
wherein said converting includes:
generating a plurality of reference voltages within a possible range for the signal voltage, each of the reference voltages being different from each other;
identifying a voltage section that includes the signal voltage from among a plurality of voltage sections, and determining a result of the identification as a value of a most significant bit of the digital signal, each of the voltage sections having a corresponding one of the reference voltages as a base point; and
converting a difference voltage into a least significant bit of the digital signal, the difference voltage indicating a difference between the signal voltage and the reference voltage that is the base point of the identified voltage section.

* * * * *